US009727365B2

(12) United States Patent
Chastain et al.

(10) Patent No.: US 9,727,365 B2
(45) Date of Patent: Aug. 8, 2017

(54) END-TO-END VALIDATION OF VIRTUAL MACHINES

(71) Applicant: AT&T Intellectual Property I, L.P., Atlanta, GA (US)

(72) Inventors: W. Cooper Chastain, Atlanta, GA (US); Larry B. Pearson, San Antonio, TX (US); Cameron Scott Blandford, Yorktown, VA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 81 days.

(21) Appl. No.: 14/684,410

(22) Filed: Apr. 12, 2015

(65) Prior Publication Data
US 2016/0299830 A1 Oct. 13, 2016

(51) Int. Cl.
*G06F 11/36* (2006.01)
*G06F 9/455* (2006.01)

(52) U.S. Cl.
CPC ...... *G06F 9/45558* (2013.01); *G06F 11/3664* (2013.01); *G06F 11/3668* (2013.01); *G06F 11/3688* (2013.01); *G06F 2009/45562* (2013.01); *G06F 2009/45575* (2013.01); *G06F 2009/45591* (2013.01)

(58) Field of Classification Search
CPC ............. G06F 11/3664; G06F 11/3668; G06F 11/3672; G06F 11/3684; G06F 11/3688; G06F 2009/45562; G06F 11/3006; G06F 11/3466
See application file for complete search history.

(56) References Cited

U.S. PATENT DOCUMENTS

| 7,617,320 | B2 | 11/2009 | Alon et al. |
| 8,412,561 | B2 | 4/2013 | Sathyan et al. |
| 8,560,671 | B1 | 10/2013 | Yahalom et al. |
| 8,769,102 | B1 * | 7/2014 | Zhou ................... G06F 11/3696 709/223 |

(Continued)

OTHER PUBLICATIONS

Feiler et al., "Four Pillars for Improving the Quality of Safety-Critical Software-Reliant Systems," Software Engineering Institute, CarnegieMellon, Apr. 2013.

(Continued)

*Primary Examiner* — Joseph Schell
(74) *Attorney, Agent, or Firm* — Hartman & Citrin LLC

(57) ABSTRACT

Concepts and technologies are disclosed herein for end-to-end validation of virtual machines. A control system including a processor can detect a validation request that can include a request to create an end-to-end validation function to perform end-to-end validation of a service. The processor can analyze a policy to determine components of the end-to-end validation function and a virtual machine that will host the end-to-end validation function. The components can include a generator function and a receiver function that can encompass the service. The processor can load, or trigger loading of, an image to the virtual machine and instantiation of the virtual machine. The image can include the end-to-end validation function. The processor also can validate the service using the end-to-end validation function based upon a test scenario stored in a test library of the end-to-end validation function.

20 Claims, 7 Drawing Sheets

(56) References Cited

U.S. PATENT DOCUMENTS

| | | | |
|---|---|---|---|
| 8,832,241 B2* | 9/2014 | Mithyantha | G06F 15/177 370/254 |
| 8,874,732 B1 | 10/2014 | Sukumaran et al. | |
| 9,146,829 B1* | 9/2015 | Allen | G06F 11/3612 |
| 2013/0167123 A1* | 6/2013 | Dura | G06F 11/3664 717/127 |
| 2013/0205020 A1* | 8/2013 | Broda | G06F 11/3495 709/224 |
| 2014/0165043 A1 | 6/2014 | Pasala et al. | |
| 2014/0282421 A1* | 9/2014 | Jubran | G06F 11/3664 717/126 |
| 2015/0356002 A1* | 12/2015 | Arif | G06F 8/60 714/38.1 |

OTHER PUBLICATIONS

Begum et al., "Investigational Study of 7 Effective Schemes of Load Balancing in Cloud Computing," International Journal of Computer Science Issues, Nov. 2013, pp. 276-287, vol. 10, Issue 6, No. 1.

* cited by examiner

END-TO-END VALIDATION OF VIRTUAL MACHINES

BACKGROUND

Service creation, maintenance, and delivery have evolved over the past several years. One area that has changed services is the advent of virtualization. For example, the European Telecommunications Standards Institute ("ETSI") network functions virtualization ("NFV"), software defined networking ("SDN"), and other "cloud" computing architectures and technologies have resulted in a change to the traditional hardware-software model or paradigm. For example, services can be created and deployed on commercial-off-the-shelf ("COTS") hardware, which can allow flexibility in terms of scaling, locating, and/or using the services. While virtualization may provide flexibility to network operators and other entities, several challenges pose difficulties in migrating services to virtualized networks. Validation of services deployed to virtualization networks may be difficult as hardware validation typically relies upon hardware-based validation devices that connect to the validated devices. Validation of virtualized environments, on the other hand, typically relies upon simulation of services and validation of the simulated services.

SUMMARY

The present disclosure is directed to end-to-end validation of virtual machines. A request to create an end-to-end validation function to validate a service can be received at a control system. The control system can analyze one or more policies and/or recipes to determine how the scaling or creation of the end-to-end validation function should be handled. The control system can access a service creation database to identify one or more "recipes" that can be used to scale or create the end-to-end validation function. The recipes can specify various test scenarios to be used in validating the service. The recipes also can define components of the end-to-end validation function including hardware, software, and/or transport for the end-to-end validation function and/or the components thereof.

The control system can access the inventory to determine if the resources needed to support the end-to-end validation function are available for use. The control system can select, allocate, and/or create the service control function that is to control the end-to-end validation function. The control system can instruct the infrastructure control to instantiate one or more virtual machine ("VMs") load and validate components of the end-to-end validation function (e.g., the generator function and the receiver function), virtual network functions ("VNFs"), and/or virtual service functions ("VSFs") to the VMs. If the end-to-end validation function is being scaled, the infrastructure control may de-allocate VMs, VNFs, and/or VSFs. The infrastructure control can also instruct the network control to create or establish transport between the components of the end-to-end validation function and/or the VMs, the VNFs, the VSFs, and/or the service control, as well as transport between the end-to-end validation function and the service being validated by the end-to-end validation function.

The service control can instantiate or tear down one or more end-to-end validation functions, in some embodiments. The network control also can receive instructions to establish transport between components of a new end-to-end validation function and/or the VSFs. The network control can establish transport using VNFs and/or physical network functions ("PNFs"). The end-to-end validation function can be validated and/or an inventory can be updated. The end-to-end validation function can include a test library. The test library can include test scenarios, test programs, or test configurations (hereinafter referred to as "test scenarios") that can be used to generate test signals that are to be used to validate the service being validated. The test scenarios can be stored in the test library and provided to the generator function, the receiving function, the analysis function, and the management function in the form of downloadable software modules. These test scenarios (test configuration modules) can enable the end-to-end validation function to perform system-specific validation tests. Test scenarios may be created and/or customized by the user, in some embodiments, via an application programming interface that can be exposed by the control system, a computer system, the management function, and/or other devices or entities. The test scenarios (test configuration modules) may be combined to enable complex use cases to test the service being validated in a complex manner. The end-to-end validation function can be remotely controllable either by an end user or by an automated system through the use of APIs to a management function of the end-to-end validation function.

According to one aspect of the concepts and technologies disclosed herein, a method is disclosed. The method can include detecting, at a control system including a processor, a validation request. The validation request can include a request to create an end-to-end validation function to perform end-to-end validation of a service. The method also can include analyzing, by the processor, a policy to determine components of the end-to-end validation function and a virtual machine that will host the end-to-end validation function. The components can include a generator function and a receiver function that can encompass the service being validated. The method also can include triggering, by the processor, loading of an image to the virtual machine and instantiation of the virtual machine. The image can include the end-to-end validation function. The method also can include validating, by the processor, the service using the end-to-end validation function based upon a test scenario stored in a test library of the end-to-end validation function.

In some embodiments, validating the service can include generating a test signal at the generator function based upon the test scenario, providing the test signal to an input of the service, receiving an output from the service at the receiver function, and comparing the output to an expected output to determine if the service should be validated. In some embodiments, the test scenario can be added to the test library via interactions with the end-to-end validation function via a configuration data application programming interface exposed by a management function of the end-to-end validation function. The test scenario can include a software module that can generate the test signal.

In some embodiments, the test signal can be generated based upon two or more test scenarios. In some embodiments, the end-to-end validation function can include the generator function, the receiver function, the test library, an analysis function, and a management function. The test scenario can be stored in the test library. In some embodiments, validating the service can include generating a test signal at the generator function based upon the test scenario. The test scenario can include a software module that can generate the test signal. Validating the service also can include providing the test signal to an input of the service, receiving an output from the service at the receiver function, comparing, using the analysis function, the output to an expected output to determine if the service should be validated, and issuing a validation decision based upon the comparing In some embodiments, the method further can include configuring the end-to-end validation function using configuration data received via an application programming interface exposed by a management function of the end-to-end validation function. In some embodiments, the method also can include determining if a library update has been received, the library update including a change to the test scenario stored in the test library. If a determination is made that the library update has been received, the end-to-end validation function can be configured to reflect the library update, and if a determination is made that the library update has not been received, a determination can be made to determine if validation of the service is complete. In some embodiments, the end-to-end validation function is not part of the service, and in some other embodiments, the end-to-end validation function can be created as part of a further service.

According to another aspect of the concepts and technologies disclosed herein, a computer storage medium is disclosed. The computer storage medium has computer-executable instructions stored thereon that, when executed by a processor, cause the processor to perform operations. The operations can include detecting a validation request including a request to create an end-to-end validation function to perform end-to-end validation of a service, analyzing a policy to determine components of the end-to-end validation function and a virtual machine that will host the end-to-end validation function. The components can include a generator function and a receiver function, and the generator function and the receiver function can encompass the service. The operations further can include triggering the loading of an image to the virtual machine and instantiation of the virtual machine. The image can include the end-to-end validation function. The operations also can include validating the service using the end-to-end validation function based upon a test scenario stored in a test library of the end-to-end validation function.

In some embodiments, the end-to-end validation function can include the generator function, the receiver function, the test library, an analysis function, and a management function. The test scenario can be stored at the test library. In some embodiments, validating the service can include generating a test signal at the generator function based upon the test scenario. The test scenario can include a software module that generates the test signal. Validating the service further can include providing the test signal to an input of the service, receiving an output from the service at the receiver function, comparing, using the analysis function, the output to an expected output to determine if the service should be validated, and issuing a validation decision based upon the comparing.

In some embodiments, the computer-executable instructions, when executed by the processor, cause the processor to perform operations further including configuring the end-to-end validation function using configuration data received via an application programming interface exposed by a management function of the end-to-end validation function. In some embodiments, the end-to-end validation function is not part of the service.

According to another aspect of the concepts and technologies disclosed herein, a system is disclosed. The system can include a processor and a memory. The memory can store computer-executable instructions that, when executed by the processor, cause the processor to perform operations. The operations can include detecting a validation request including a request to create an end-to-end validation function to perform end-to-end validation of a service, analyzing a policy to determine components of the end-to-end validation function and a virtual machine that will host the end-to-end validation function. The components can include a generator function and a receiver function, and the generator function and the receiver function can encompass the service. The operations further can include triggering loading of an image to the virtual machine and instantiation of the virtual machine. The image can include the end-to-end validation function. The operations also can include validating the service using the end-to-end validation function based upon a test scenario stored in a test library of the end-to-end validation function.

In some embodiments, the end-to-end validation function can include the generator function, the receiver function, the test library, an analysis function, and a management function. The test scenario can be stored at the test library. In some embodiments, validating the service can include generating a test signal at the generator function based upon the test scenario. The test scenario can include a software module that generates the test signal. Validating the service further can include providing the test signal to an input of the service, receiving an output from the service at the receiver function, comparing, using the analysis function, the output to an expected output to determine if the service should be validated, and issuing a validation decision based upon the comparing. In some embodiments, the computer-executable instructions, when executed by the processor, cause the processor to perform operations further including configuring the end-to-end validation function using configuration data received via an application programming interface exposed by a management function of the end-to-end validation function. In some embodiments, the end-to-end validation function is not part of the service.

Other systems, methods, and/or computer program products according to embodiments will be or become apparent to one with skill in the art upon review of the following drawings and detailed description. It is intended that all such additional systems, methods, and/or computer program products be included within this description, be within the scope of this disclosure.

DETAILED DESCRIPTION

Figure 1:
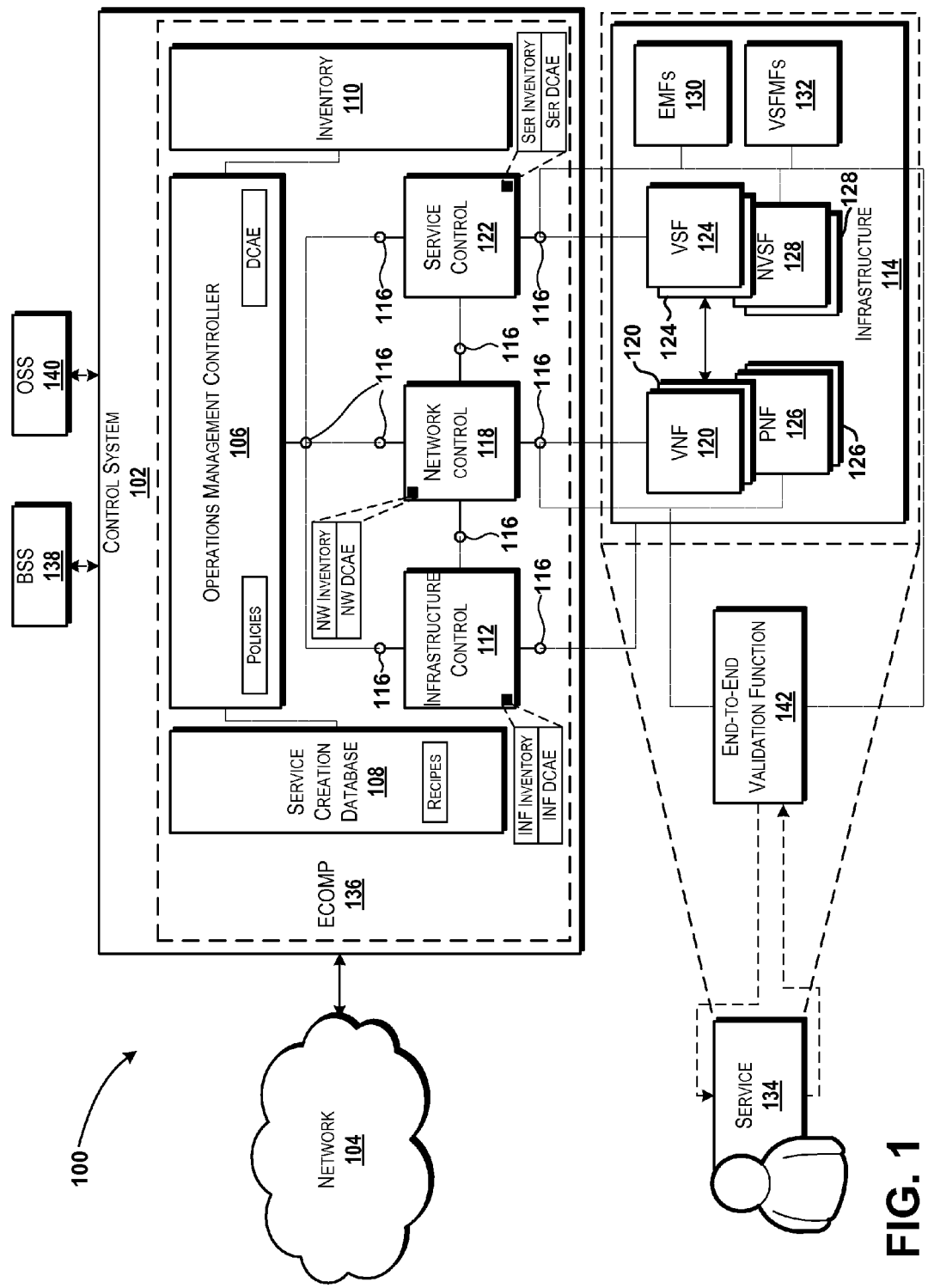
FIG. 1 is a system diagram illustrating an illustrative operating environment for various embodiments of the concepts and technologies described herein.

The following detailed description is directed to end-to-end validation of virtual machines. A request to create an end-to-end validation function to validate a service can be received at a control system. The control system can analyze one or more policies and/or recipes to determine how the scaling or creation of the end-to-end validation function should be handled. The control system can access a service creation database to identify one or more "recipes" that can be used to scale or create the end-to-end validation function. The recipes can specify various test scenarios to be used in validating the service. The recipes also can define components of the end-to-end validation function including hardware, software, and/or transport for the end-to-end validation function and/or the components thereof.

The control system can access the inventory to determine if the resources needed to support the end-to-end validation function are available for use. The control system can select, allocate, and/or create a service control function that is to control the end-to-end validation function. The control system can instruct the infrastructure control to instantiate one or more virtual machine ("VMs") load and validate components of the end-to-end validation function (e.g., the generator function and the receiver function), VNFs, and/or VSFs to the VMs. If the end-to-end validation function is being scaled, the infrastructure control may de-allocate VMs, VNFs, and/or VSFs. The infrastructure control can also instruct the network control to create or establish transport between the components of the end-to-end validation function and/or the VMs, the VNFs, the VSFs, and/or the service control, as well as transport between the end-to-end validation function and the service being validated by the end-to-end validation function.

The service control can instantiate or tear down one or more end-to-end validation functions, in some embodiments. The network control also can receive instructions to establish transport between components of a new end-to-end validation function and/or the VSFs. The network control can establish transport using VNFs and/or PNFs. The end-to-end validation function can be validated and/or an inventory can be updated. The end-to-end validation function can include a test library. The test library can include test scenarios, test programs, or test configurations (hereinafter referred to as "test scenarios") that can be used to generate test signals that are to be used to validate the service being validated. The test scenarios can be stored in the test library and provided to the generator function, the receiving function, the analysis function, and the management function in the form of downloadable software modules. These test scenarios (test configuration modules) can enable the end-to-end validation function to perform system-specific validation tests. Test scenarios may be created and/or customized by the user, in some embodiments, via an application programming interface that can be exposed by the control system, a computer system, the management function, and/or other devices or entities. The test scenarios (test configuration modules) may be combined to enable complex use cases to test the service being validated in a complex manner. The end-to-end validation function can be remotely controllable either by an end user or by an automated system through the use of APIs to a management function of the end-to-end validation function.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Referring now to FIG. 1, aspects of an operating environment 100 for various embodiments of the concepts and technologies disclosed for end-to-end validation of virtual machines will be described, according to an illustrative embodiment. The operating environment 100 shown in FIG. 1 includes a computing device or system (hereinafter referred to as a "control system") 102. The control system 102 can host a network control framework. The control system 102 can operate on, in communication with, and/or as a part of a communications network ("network") 104. Additional aspects of the network 104 are illustrated and described below with reference to FIG. 6. Briefly, it should be understood that the network 104 can include almost any type of computer network as well as communications networks.

According to various embodiments, the functionality of the control system 102 may be provided by one or more server computers, workstations, desktop computers, laptop computers, other computing systems, combinations thereof, or the like. In some embodiments, the functionality of the control system 102 can be provided by a distributed computing system that can host processing and/or storage resources that collectively can be configured to provide the functionality illustrated and described herein. Thus, it should be understood that the functionality of the control system 102 can be provided by a single device, by two or more similar devices, and/or by two or more dissimilar devices. For purposes of describing the concepts and technologies disclosed herein, the control system 102 is described herein as including a server computer. It should be understood that this embodiment is illustrative, and should not be construed as being limiting in any way.

The control system 102 can execute an operating system (not shown in FIG. 1) and one or more application programs, modules, or other computer-executable instructions that, when executed by a processor (not shown in FIG. 1) of the control system 102 can provide the functionality illustrated and described herein. The operating system can include a computer program for controlling the operation of the device, and the application programs, modules, or other computer-executable instructions can include executable programs configured to execute on top of the operating system to provide various functions as illustrated and described herein.

Although the control system 102 is illustrated and described in FIG. 1 as including multiple modules, components, and/or other elements, it should be understood that the functionality of these modules, components, and/or elements can be provided by application modules executed by a single device, in some embodiments. In some other embodiments, the functionality of the modules, components, and/or elements can be provided by multiple devices. As such, the illustrated and described embodiment should be understood as being illustrative of one contemplated embodiment of the concepts and technologies described herein and should not be construed as being limiting in any way.

As shown in FIG. 1, the control system 102 can include an operations management controller 106. The operations management controller 106 can be configured to provide control and management of the control system 102 and/or the various elements thereof. According to various embodiments, the operations management controller 106 can provide high level and end-to-end control of services and applications (referred to herein as "services"), creation of services, and/or management of services, as well as creation, validation, and/or management of end-to-end validation elements as will be illustrated and described in further detail herein.

According to various embodiments of the concepts and technologies described herein, the operations management controller 106 can manage services and/or end-to-end validation elements across multiple "scopes" or "domains." As used herein, the terms "scope," "scope domain," and/or "domain" can be used to refer to aspects of the concepts and technologies described herein and can include, but are not necessarily limited to, an infrastructure scope, a network scope, and a service or application ("service") scope. The operations management controller 106 also can control and orchestrate service creation and management; validation of services and/or service components; as well as creation, management, and validation of end-to-end validation functionality as will be illustrated and described herein.

According to various embodiments of the concepts and technologies described herein, the operations management controller 106 can serve or function as a master service orchestrator ("MSO") for the control system 102. The operations management controller 106 can instantiate new services and/or end-to-end validation functions based upon "recipes" that can be stored in a service creation database 108 or elsewhere as illustrated and described herein. The operations management controller 106 also can use information stored in the inventory 110 when creating new services and/or end-to-end validation functions. As will be explained in more detail hereinbelow, while some services can include end-to-end validation functionality, various embodiments of the concepts and technologies described herein are directed to providing standalone end-to-end validation functions that can be chained to services or can encapsulate or encompass the services. Thus, various embodiments of the concepts and technologies described herein specifically avoid locating end-to-end validation functionality between services or outside of the services, as such location could undermine the various benefits illustrated and described herein. The end-to-end validation functions illustrated and described herein can operate independently of the services, but can validate the services by feeding data to the services and receiving output from the services as will be illustrated and described herein in more detail below. The operations management controller 106 also can instantiate scope control domain entities (e.g., controllers for infrastructure, network resources, and/or service functions), as will be explained in more detail below.

The operations management controller 106 can handle messages and/or exceptions that can be generated by the operations management controller 106 and/or exceptions that may be passed to the operations management controller 106 from the scope control domain (e.g., the controllers for the infrastructure, network resources, and/or the service functions) as will be illustrated and described below in more detail. In some embodiments, end-to-end validation functions can generate events and/or reports that can be routed to and/or handled by the operations management controller 106 or other entities, as will be illustrated and described in more detail below.

The operations management controller 106 also can run one or more high level data collection, analytics, and event handling ("DCAE") processes to analyze data or events relating to services, end-to-end validation functions, and/or the various components for managing the services, end-to-end validation functions, and/or their associated infrastructure, network, and service components. The operations management controller 106 also can run a policy decision function using a high level set of policies for service creation, control, and/or validation as well as end-to-end validation function creation, control, validation, and the like.

As mentioned above, the service creation database 108 can define products and services using definitions of components of services such as hardware, software, and/or transport that can be referred to herein as "recipes" or "service recipes." The recipes for services can define one or more end-to-end validation functions or function components, in some embodiments, while in some other embodiments the end-to-end validation functions and/or components can have end-to-end validation recipes that can be stored in the service creation database 108. The recipes can specify one or more components of a service and/or end-to-end validation function as well as processes or operations for putting the service and/or end-to-end validation function components together. The recipes also can include test scenarios for the end-to-end validation functions. Thus, multiple recipes for test scenarios can be combined to produce complex test cases for use in performing the end-to-end validation of a service or virtual machine.

The service and/or end-to-end validation function recipes may involve a service scope (e.g., a set of service or application functions), a network scope (e.g., a set of network functions and/or information indicating how network transport is to be established, maintained, and/or used), and an infrastructure scope (e.g., where on the network 104 or other hardware the network and service functions are to be located). The recipes also can implicitly or explicitly specify whether the various components of the service and/or end-to-end validation function should be chained together or if the components should operate independently of one another. It should be understood that the term "service" as used herein can include an "application." Thus, it should be understood that the term "service" is not used to limit the concepts and technologies described herein in any way. The service creation database 108 can be used by a service provider, by third parties, and/or by customers.

The inventory 110 can maintain or reflect up-to-date information about resource utilization. The information can include a total number of resources, an amount of available resources, an amount of resources in use, or the like. It should be understood that the "resources" can include infrastructure resources, network resources, and/or service resources. Thus, the inventory 110 can be used to understand what resources (in terms of infrastructure, network, and/or service) exist, what resources are in use, and/or what resources are free or available.

According to various embodiments, the inventory 110 can reside entirely within a control domain (e.g., within a service domain, network domain, or infrastructure domain) or elsewhere. For example, in some embodiments the inventory 110 can reside and/or can be represented by an inventory and/or data structure that is hosted by the control system 102, the network 104, and/or elsewhere. Thus, in some embodiments the inventory 110 can include data indicating or reflecting all inventory (infrastructure, network, and service) for the entire network 104 and/or the elements in communication with the network 104. Thus, the inventory 110 can provide an end-to-end active view capability for active and/or inactive resources across all scopes of the control system 102.

In some other embodiments, the inventory 110 may be divided across the scope controllers (described in further detail below) so that each controller can have a local inventory that relates to the scope or domain of that controller. A controller for the infrastructure domain, for example, can maintain an infrastructure inventory. Similarly, controllers for network and service scopes can maintain scope-specific inventories. Even if scope-specific inventories are provided, the inventory 110 still can provide end-to-end viewing capability for a divided or distributed inventory embodiment, if desired. It should be understood that this example is illustrative and therefore should not be construed as being limiting in any way.

According to various embodiments, the operations management controller 106 can communicate with one or more infrastructure control elements or controllers (collectively referred to herein as "infrastructure control") 112. The infrastructure control 112 can manage assets of network infrastructure ("infrastructure") 114. Thus, the infrastructure control 112 can interact with the infrastructure 114 to instantiate virtual resources such as virtual machines and/or virtual storage devices and/or to allocate hardware resources that will host various service and/or network functions as illustrated and described herein. According to some embodiments, however, the infrastructure control 112 may not manage networking functions and/or service functions, as will be explained in more detail below.

The infrastructure control 112 can include and/or can execute a policy engine using an infrastructure set of policies. The infrastructure control 112 also can handle infrastructure scope exceptions, in some embodiments. The infrastructure control 112 can include functionality for managing and orchestrating the infrastructure 114; infrastructure element management functions ("EMFs"), which may manage various fault, configuration, accounting, performance, and security ("FCAPS") capabilities; an infrastructure data, collection, analytics, and events ("DCAE") process (labeled as "INF DCAE" in FIG. 1) that can provide information to the controller and/or to the operations management controller 106; a policy decision function with infrastructure scope policies; and/or an infrastructure inventory function (labeled "INF Inventory" in FIG. 1) that can represent infrastructure-scoped inventory and usage information or provide this information to the inventory 110. It should be understood that this example is illustrative and therefore should not be construed as being limiting in any way.

The infrastructure control 112 can receive instructions and/or requests from the operations management controller 106 or other entities via an operations management application programming interface ("API") 116. As shown in FIG. 1, there can be multiple APIs 116 that can be called or accessed by various elements of the control system 102 to support the functionality illustrated and described herein. Although the APIs 116 are given the same reference numeral in the drawings, it should be understood that one or more (or each) of the APIs 116 can use different technologies (e.g., formats and/or semantics) to support calls to the various elements and/or to support the communications illustrated and described herein. According to some embodiments, the API 116 between the infrastructure control 112 and the operations management controller 106 can correspond to an operations management ("OM") API 116, though this is not necessarily the case.

Similarly, the infrastructure control 112 can communicate with a network control device or controller (hereinafter collectively referred to as the "network control") 118 via a software defined networking ("SDN") API 116. Thus, it can be appreciated that the infrastructure control 112 and the network control 118 can support SDN and virtualization technologies simultaneously. As will be explained in more detail below, the network control 118 can be configured to create and manage virtual networking functions ("VNFs") 120 within the infrastructure 114. In some instances, the infrastructure control 112 also can load VM images with embedded VNFs 120 (e.g., a virtual switch) in addition to, or instead of, the network control 118. The functionality of the network control 118 will be described in more detail below. The infrastructure control 112 also can load end-to-end validation functions to one or more VMs and/or can include end-to-end validation functionality in VM images that can be loaded to the VMs. As will be explained in more detail below, the end-to-end validation functions can include, but are not limited to, a generator function and a receiver function. The functionality of the generator function and the receiver function, as well as other aspects of creating end-to-end validation functions, will be explained in more detail below, particularly with reference to FIGS. 2-7.

The infrastructure control 112 also can communicate with the infrastructure 114 via an API 116. Thus, the infrastructure control 112 can interact with the infrastructure 114 to instantiate resources and/or allocate hardware to support various functions as illustrated and described herein. In addition to supporting the VNFs 120, the infrastructure 114 also can interact with a service control device or controller (hereinafter collectively referred to as the "service control") 122 to receive instructions for instantiating one or more virtual service functions ("VSFs") 124 within the infrastructure 114 as well as receive instructions for instantiating one or more end-to-end validation functions and/or end-to-end validation function components as will be illustrated and described in more detail below. A VSF 124 can include a virtualized application or application component, and can be used to create other services of various types including, but not limited to, basic services, segmented services, and/or composite services as will be illustrated and described in more detail herein. The functionality of the service control 122 and creation of various types of services using the service control 122 will be described in more detail below.

The operations management controller 106 also can communicate with the network control 118. The network control 118 can be responsible for management, deployment, operation, and coordination of a transport network for a particular service and/or end-to-end validation function. According to various embodiments, the transport network between one or more components of a service and/or end-to-end validation functions can be created by creating a group of one or more VNFs 120 within the infrastructure 114. The transport network also can include physical network functions ("PNFs") 126, which can be selected from an available inventory of physical resources, configured, and/or controlled by the network control 118.

The transport network can include various VNFs 120, PNFs 126, and/or other networking functions. The PNFs 126 can include, for example, European Telecommunications Standards Institute PNFs ("ETSI PNFs"). In some embodiments, the transport network may include other types of networking functions such as leaf switches, spine switches, or the like, while in some other embodiments, leaf switches and/or spine switches may be considered part of the infrastructure 114. The VNFs 120 can include virtualized network functions that can exist in the network scope. Thus, according to various embodiments, the VNFs 120 can include virtual switches ("vSwitches"), virtualized routing functions and/or virtual routers, a virtual tap, or the like. Because the transport network can include other types of functions, it should be understood that these examples are illustrative and therefore should not be construed as being limiting in any way.

The network control 118 also can establish and manage software defined networks, maintain a network scope resource inventory, run a network scope data collection and analysis process, run a policy engine using a network scope set of policies, and handle network scope exceptions. The network control 118 can include a software defined network controller; one or more virtual network function management functions; one or more network element management functions, which can manage FCAPS for network scoped services; a network DCAE process (labeled as "NW DCAE" in FIG. 1), which can provide information to the network control 118 and/or the operations management controller 106; a network policy engine with network scope policies; and a network inventory function (labeled as "NW Inventory" in FIG. 1), which can provide network scoped inventory and usage information to the inventory 110.

According to various embodiments, the network control 118 can receive requests from the operations management controller 106 via an API 116 such as the operations management ("OM") API 116 discussed above. The requests from the operations management controller ("OMC") 106 received via the OM API 116 can instruct the network control 118 to create, modify, and/or terminate one or more networking functions such as VNFs 120, PNFs 126, and/or some infrastructure networking functions, if controlled or controllable by the network control 118. The network control 118 also can be instructed by the service control 122 and/or the operations management controller 106 to create, modify, and/or terminate one or more end-to-end validation functions and/or function components such as a generator function and/or a receiver function (not shown in FIG. 1). The creation, configuration, and validation of the end-to-end validation functions will be illustrated and described in more detail below, particularly with reference to FIGS. 2-5.

These infrastructure networking functions can include network hardware (e.g., switches, leaf switches and spine switches, or the like) and other infrastructure networking functions. Some other infrastructure networking functions (e.g., wires, physical ports, switches, leaf switches and spine switches (if not controlled by network control 118)), or the like, can be considered a part of the infrastructure 114. The network control 118 also can be configured to receive instructions to establish or modify transport using VNFs 120 and/or PNFs 126 in addition to, or instead of, instantiating the VNFs 120 and/or the PNFs 126. It should be understood that this example is illustrative and therefore should not be construed as being limiting in any way.

The network control 118 also can initiate requests to the infrastructure control 112 via the OM API 116 to request and/or obtain additional network resources. For example, the network control 118 can request the infrastructure control 112 to allocate one or more virtual machines ("VMs") and load an image with an embedded VNF 120 to the VM. The network control 118 also can receive requests via an SDN API 116 from infrastructure control 112 to create, modify, and/or terminate transport. Thus, it can be appreciated that the network control 118 can support SDN and virtualization technologies simultaneously. It should be understood that this example is illustrative and therefore should not be construed as being limiting in any way.

The operations management controller 106 also can communicate with the service control 122. The service control 122 can be responsible for management, deployment, operation, and coordination of services. Services can be provided by and/or can include one or more VSFs 124, non-virtualized service functions ("NVSFs") 128, one or more EMFs 130, one or more VSF management functions (labeled "VSFMFs" in FIG. 1) 132, combinations thereof, or the like.

According to various embodiments, the services, service components, end-to-end validation functions, and/or end-to-end validation function components can be created by the service control 122 by creating a group of one or more VSFs 124, network virtual service functions (NVSFs) 128 within the infrastructure 114. Thus, it should be understood that the NVSFs 128 can be created and/or controlled by the service control 122. It also should be understood that the operations management controller 106 can create or prompt creation of the VSFs 124 and initiate requests to the infrastructure 114 and network control 118. As such, it should be understood that the operations management controller 106 and/or the service control 122 can create a service, and/or an end-to-end validation function, depending upon a degree of delegation awarded to the service control 122 by the operations management controller 106 when the operations management controller 106 created the service control 122.

According to various embodiments, the service control 122 also can maintain a service scope resource inventory (labeled "Ser Inventory" in FIG. 1). The service scope resource inventory can be maintained at the service control 122, in some embodiments, and can provide service scope resource inventory and usage information to the inventory 110. The service control 122 can also run a service scope DCAE (labeled as "Ser DCAE" in FIG. 1) to analyze messages and/or events occurring within or relating to services, service components, and/or service functions such as the VSFs 124 and the NVSFs 128.

The service control 122 also can run a policy engine for a service scope set of policies. Thus, service-specific policies can be applied and/or used by the service control 122 when creating services, service components, and/or service functions such as the VSFs 124 and/or the NVSFs 128; as well as end-to-end validation functions and/or end-to-end validation function components as will be illustrated and described in more detail below with reference to FIG. 2. The service control 122 also can handle service scope exceptions, in some embodiments. As noted above, the operations management controller 106 also can create services, service components, service functions, end-to-end validation functions, and/or end-to-end validation function components depending upon the degree to which the operations management controller 106 delegates control to the service control 122. It should be understood that these example components of the service control 122 are illustrative and therefore should not be construed as being limiting in any way.

The service control 122 can be responsible for management and control of services, components or functions of the services, end-to-end validation functions, and/or components of the end-to-end validation functions. According to various embodiments, the service control 122 can manage VSFs 124 and/or service functions NVSFs 128 of services being controlled as well as components of the end-to-end validation functions illustrated and described herein. The service control 122 also can handle service EMFs, which can manage FCAPS for services being controlled. The service DCAE process can provide information to the service control 122 and/or the operations management controller 106. The service control 122 also can include a service policy engine, which can apply and/or enforce service scope policies. The service inventory can provide service scope inventory and/or usage information to the inventory 110.

According to various embodiments, the service control 122 can receive requests from the operations management controller 106 via an API 116 such as the OM API 116 discussed above. The requests from the operations management controller 106 received via the OM API 116 can instruct the service control 122 to create, modify, and/or terminate one or more service functions such as VSFs 124, the NVSFs 128, and the like, as well as to create, modify, and/or terminate one or more end-to-end validation functions and/or end-to-end validation function components. It should be understood that this example is illustrative and therefore should not be construed as being limiting in any way.

The service control 122 also can initiate requests to the infrastructure control 112 via the OM API 116 to request and/or obtain additional infrastructure resources and/or other resources. The service control 122 also can initiate requests via an SDN API 116 to the network control 118. Thus, it can be appreciated that the service control 122 can support SDN and virtualization technologies simultaneously. These requests can be configured to request creation, modification, and/or termination of service-related transport and/or end-to-end validation function transport (e.g., transport between service functions, service control functions, end-to-end validation functions, and/or end-to-end validation function components). It should be understood that this example is illustrative and therefore should not be construed as being limiting in any way.

The APIs 116 illustrated and described herein can include two or more types of APIs 116. In some embodiments, as mentioned above, the APIs 116 can include an OM API 116 and/or SDN APIs 116. The APIs 116 can be exposed by some or all of the components within the control system 102. The APIs 116 can be exposed by the components to each other, for various purposes. For example, the APIs 116 can include an operations management API 116, which can be exposed by the operations management controller 106; infrastructure APIs 116, which can be exposed by the infrastructure control 112; network APIs 116, which can be exposed by the network control 118; and service APIs 116, which can be exposed by the service control 122. Thus, it can be appreciated that the control system 102 and the components thereof can support SDN and virtualization technologies simultaneously.

The APIs 116 can be used to enable operational management within the control system 102 and between the control system 102 and the infrastructure 114. The APIs 116 can be exposed in either direction. As such, the APIs 116 can be exposed in a southbound direction, e.g., from the operations management controller 106 to the infrastructure control 112, the network control 118, or the service control 122; from the infrastructure control 112 to the infrastructure 114; from the network control 118 to the VNFs 120 loaded to the infrastructure 114; and/or from the service control 122 to the VSFs 124 loaded to the infrastructure 114. The APIs 116 also can enable communications in a northbound direction, e.g., the APIs 116 can enable the VNFs 120 to access the network control 118; the VSFs 124 to access or communicate with the service control 122; and the infrastructure 114 to access the infrastructure control 112. Similarly, the APIs 116 can be accessed by the infrastructure control 112, the network control 118, and/or the service control 122 to enable access to the operations management controller 106. It should be understood that this example is illustrative and therefore should not be construed as being limiting in any way.

The SDN APIs 116 can be exposed by the network control 118 to the operations management controller 106, the infrastructure control 112, and the service control 122. The SDN APIs 116 can enable the operations management controller 106, the infrastructure control 112, and the service control 122 to make requests to the network control 118 for SDN services. It should be understood that this example is illustrative and therefore should not be construed as being limiting in any way.

By creating, allocating, and/or instantiating the VNFs 120, the PNFs 126, the VSFs 124 the NVSFs 128, the EMFs 130, the VSF management functions 132, and/or combinations thereof, the control system 102 can create a service 134 on the infrastructure 114. It should be understood that this example is illustrative and therefore should not be construed as being limiting in any way.

According to various embodiments, the control system 102 can integrate an enhanced control, orchestration, management, and policy framework (hereinafter referred to as "ECOMP") 136, which can be integrated into the control system 102. The ECOMP 136 can enable rapid service creation by combining pre-built components and/or functions. The ECOMP 136 also can enable dynamically elastic capacity management by enabling scaling and instantiation. The ECOMP 136 also can support control functions. The control functions can be driven by real-time analytics and policy decisions.

The ECOMP 136 also can support unified operations, administration, and management across the three scopes (e.g., infrastructure, network, and service). The ECOMP 136 also can support optimization of end-to-end validation functions and/or services 134 and/or the components of the end-to-end validation functions and/or services 134, analytics of the end-to-end validation functions and/or the services 134, components thereof, and/or the various components of the control system 102. As illustrated and described in the FIGURES, the ECOMP 136 can be an element of the control system 102, in some embodiments, while in other embodiments the control system 102 can correspond to an embodiment of the ECOMP 136. It should be understood that these examples are illustrative and therefore should not be construed as being limiting in any way.

The ECOMP 136 can include a service design and creation ("SDC") environment, an active and available inventory ("AAI"), an operations management framework ("OMF"), and/or a service, infrastructure, and/or network control. Thus, the ECOMP 136 can include, in some embodiments, the service creation database 108, the inventory 110, the operations management controller 106, and/or one or more of the infrastructure control 112, the network control 118, and/or the service control 122. It should be understood that this example is illustrative and therefore should not be construed as being limiting in any way.

The SDC component of the ECOMP 136 can enable developers, service designers, network planners/engineers, operations planners and product managers, other entities, or the like, to create, organize, prototype, and deploy services 134. In some embodiments, service definitions can be instantiated by the OMF and the resulting service instances can be recorded in the AAI. According to various embodiments, components associated with a service 134 can be created in the SDC component and stored as recipes. Thus, the SDC component can store recipes for VSF components, VSFs 124, service components, end-to-end validation functions, end-to-end validation function components, and various network and/or infrastructure resources. The recipes also can indicate whether or not various components of the end-to-end validation functions and/or the services 134 are to be chained together or, as will generally be the case according to various embodiments of the concepts and technologies described herein, if the end-to-end validation functions are to encompass or encapsulate the services 134 and therefore that these components will operate independently of one another. It should be understood that this example is illustrative and therefore should not be construed as being limiting in any way.

The AAI can provide real-time views of services, infrastructure, and networks in aggregate. The AAI can obtain the data from the service control 122 and the network control 118, and/or can supplement views with customer and account data. The OMF can provide and extend upon FCAPS capabilities through the use of analytics, policy, orchestration, and control functions. The OMF can be a repeating pattern of control, orchestration, DCAE, and policy management functions. It should be understood that this example is illustrative and therefore should not be construed as being limiting in any way.

In some embodiments, the OMF and service, infrastructure, and network control functions can form a series of closed loop control capabilities. These capabilities can be referred to as "operational control loops." These "operational control loops" can be based on data and events collected and analyzed via the DCAE. Responsive actions can be based upon policy, and may be taken by one or more of orchestration or controller functions. "Operational control loops" can be repeating patterns that may be implemented in various locations and supporting various scopes of operation.

In some embodiments, the OMF can interact with one or more business support system ("BSS") 138 and one or more operations support system ("OSS") 140. The BSS 138 and the OSS 140 can be external to the ECOMP 136, in some embodiments. The BSS 138 and the OSS 140 can interact with customers and operations in support of activities and aggregate capabilities across services within and outside of the operating environment 100.

Each instantiation of the OMF can be specifically tailored to the scope in which the OMF operates. The OMF may exist as a top-level function that can be separate from service, infrastructure, and network control, and the platform components of the OMF may exist in various places within service and network control. It should be understood that this example is illustrative and therefore should not be construed as being limiting in any way.

As mentioned above, although the operations management controller 106, the service creation database 108, the inventory 110, the infrastructure control 112, the network control 118, the service control 122, and the ECOMP 136 are illustrated as components of the control system 102, it should be understood that each of these components, or combinations thereof, may be embodied as or in stand-alone devices or components thereof operating as part of or in communication with the network 104 and/or the control system 102. Thus, for example one or more of these components can be hosted by a server computer or other computing device that can access other devices via one or more of the APIs 116, and/or can be accessed via one or more of the APIs 116. As such, the illustrated embodiment should be understood as being illustrative of only some contemplated embodiments and should not be construed as being limiting in any way.

As shown in FIG. 1, the control system 102 also can be used to create, validate, and/or manage one or more end-to-end validation functions 142. The end-to-end validation function 142 can be created as a service 134 by the control system 102, as part of a service 134, or as an independent function or application as illustrated and described herein. It should be noted, however, that the end-to-end validation function 142 recited in the claims does not include embodiments of the end-to-end validation function that are created as part of another service 134 unless explicitly recited as such in the claims. The end-to-end validation function 142 can include multiple components, as will be illustrated and described in more detail below particularly with reference to FIG. 2.

The control system 102 can be configured to chain the end-to-end validation function 142 to other services 134, in some embodiments, or to encapsulate or encompass a service 134 with the end-to-end validation function 142 by locating one component of the end-to-end validation function 142 (e.g., a generator function) at an input of the service 134 being tested and locating another component of the end-to-end validation function 142 (e.g., a receiver function) at an output of the service 134 being tested. Thus, as used herein, "encompassing" or "encapsulating" as used with reference to the end-to-end validation function 142 can refer to arranging the end-to-end validation function components such that input to the service 134 and output from the service 134 are controlled by the end-to-end validation function 142 such that true testing of the service 134 or a virtual machine that hosts the service 134 can be completed without interference of any kind.

Figure 2:
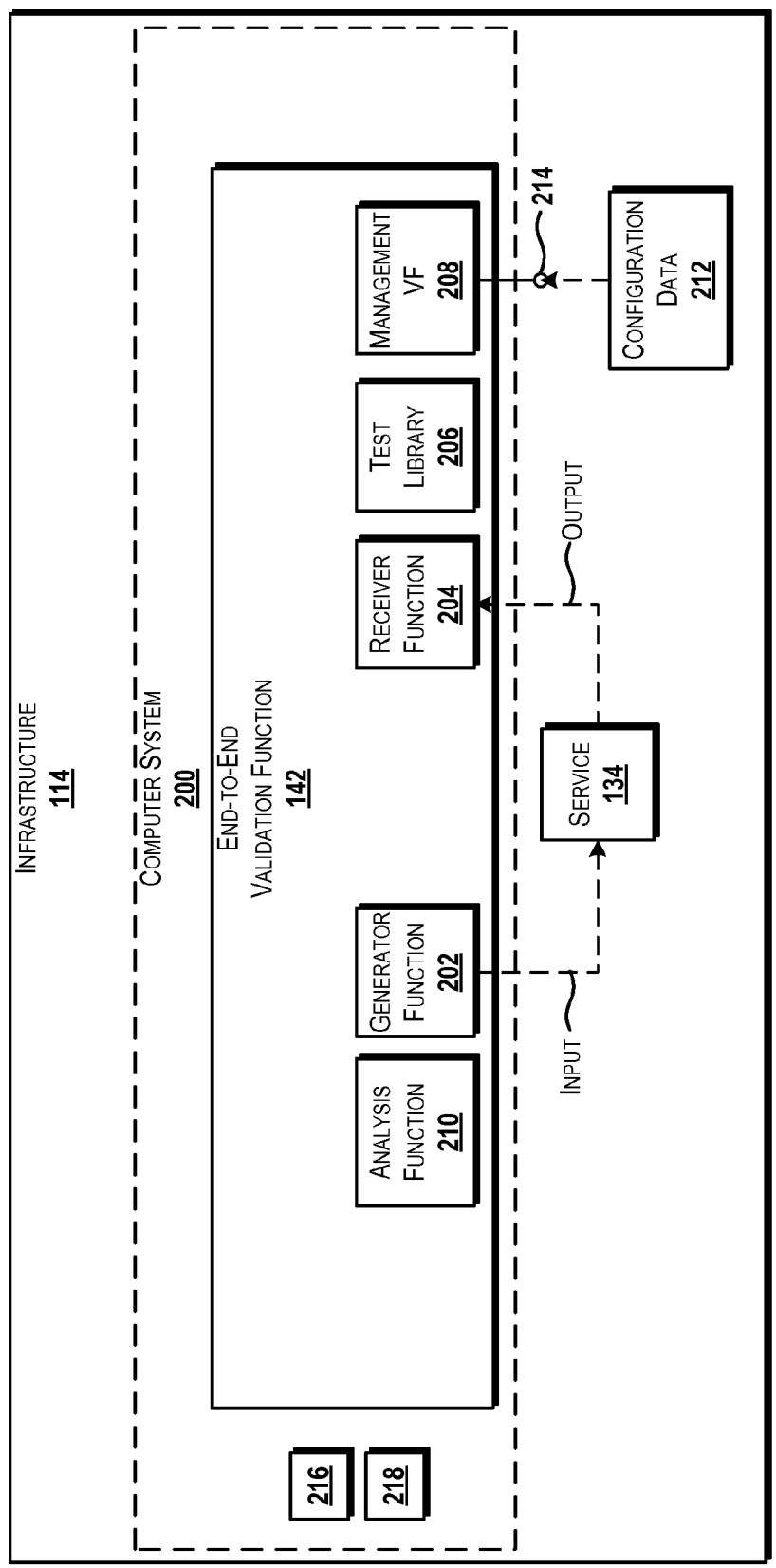
FIG. 2 is a system diagram illustrating additional aspects of various embodiments of the concepts and technologies described herein.

The components of the end-to-end validation function 142 will be illustrated and described in more detail herein, particularly with reference to FIG. 2, but briefly, the end-to-end validation function 142 can include a generator function, a receiver function, a test library, a management function, an analysis function, and/or other functions. In some embodiments, two or more of these or other components of the end-to-end validation function 142 can be combined, though this is not necessarily the case.

According to various embodiments, the components of the end-to-end validation function 142 can be created, modified, managed, and/or terminated by the service control 122. Transport between the components of the end-to-end validation function 142 can be created, modified, managed, and/or terminated by the network control 118 and/or by the service control 122 via the network control 118. The configuration of these and other components of the end-to-end validation function 142 will be illustrated and described in more detail below.

According to various embodiments of the concepts and technologies described herein, the end-to-end validation function 142 can encompass the service 134. Thus, a generator function of the end-to-end validation function 142 can generate test signals based upon one or more test scenarios included in the test library. As explained above, the test signals input into the service 134 being tested can be generated by the generator function based upon one test scenario and/or a complex test case that can be created by combining multiple test scenarios. The generator function can route the test signals or other data or traffic into the service 134 and a receiver function of the end-to-end validation function 142 can receive output signals or other data or traffic from the service 134. The end-to-end validation function 142 can generate the test signals using test scenarios and/or combinations of test scenarios (for complex test scenarios). The output from the service 134 can be routed by the end-to-end validation function 142 to an entity for analysis.

In some embodiments, the output can be routed to the analysis function while in some other embodiments, the end-to-end validation function 142 can route the output to an entity that creates and/or controls the end-to-end validation function 142 such as the service control function, the management control, or other entities. Thus, it can be appreciated that in some embodiments, the end-to-end validation function 142 can be created by the service control 122 and the output can be routed by the end-to-end validation function 142 to the service control 122. It should be understood that this example is illustrative and therefore should not be construed as being limiting in any way.

The management function can be created as a virtual service function that can control the end-to-end validation function 142. Thus, the management function can control routing of signals to, within, and/or from the end-to-end validation function 142; control configuration and/or modification of the test library; activate and/or terminate validation; combinations thereof; or the like. Thus, when the description herein refers to the end-to-end validation function 142 performing particular operations, it can be appreciated that such performance can be triggered and/or controlled by the management function, in some embodiments. It should be understood that this example is illustrative and therefore should not be construed as being limiting in any way.

In practice, the operations management controller 106 can detect a request (end-to-end validation request) for an end-to-end validation function 142 and/or validation of a service 134. According to various embodiments, the operations management controller 106 can detect a request to configure or reconfigure an end-to-end validation function 142 or a request for a new end-to-end validation function 142. In some embodiments of creating or scaling end-to-end validation functions 142, the operations management controller 106 can analyze one or more policies and/or recipes to determine how the scaling or creation of the end-to-end validation function 142 should be handled.

The operations management controller 106 also can access the service creation database 108 to identify one or more "recipes" that can be used to scale or create the end-to-end validation function 142. The recipes also can specify various test scenarios to be used in validating a service 134 by the end-to-end validation function 142. The recipes also can define components of the end-to-end validation function 142 including hardware, software, and/or transport for the end-to-end validation function 142 and/or the components thereof.

The operations management controller 106 can access the inventory 110 to determine if the resources needed to support the end-to-end validation function 142 are available for use. The operations management controller 106 also can identify a service control function that is to control the end-to-end validation function 142. Thus, the operations management controller 106 can select, allocate, and/or create the service control function that is to control the end-to-end validation function 142.

The operations management controller 106 can instruct the infrastructure control 112 to instantiate one or more VMs and to load and validate components of the end-to-end validation function 142 (e.g., the generator function and the receiver function), VNFs 120, and/or VSFs 124 to the VMs. It should be understood that if the end-to-end validation function 142 is being scaled, the infrastructure control 112 may de-allocate VMs, VNFs 120, and/or VSFs 124. The infrastructure control 112 can also instruct the network control 118 to create or establish transport between the components of the end-to-end validation function 142 and/or the VMs, the VNFs 120, the VSFs 124, and/or the service control 122, as well as transport between the end-to-end validation function 142 and the service 134 being validated by the end-to-end validation function 142. In the case of a scaled down end-to-end validation function 142, it can be appreciated that the network control may de-allocate or tear down transport. The network control 118 can report events to the network DCAE and/or update the network inventory (and/or the inventory 110).

The service control 122 can receive instructions from the operations management controller 106 to instantiate or tear down one or more end-to-end validation functions 142, in some embodiments. The service control 122 can report an event to a service DCAE and update the service inventory (and/or the inventory 110). The network control 118 also can receive instructions to establish transport between components of a new end-to-end validation function 142 and/or the VSFs 124 and report events to the network DCAE for scaled up end-to-end validation functions 142 and/or can tear down network transport supporting end-to-end validation functions and/or the VSFs 124 and report events to the network DCAE for scaled down end-to-end validation functions 142. The network control 118 can establish transport using VNFs 120 and/or PNFs 126. The operations management controller 106 can validate the end-to-end validation function 142 and/or update the inventory 110.

As noted above, the end-to-end validation function 142 can include a test library. The test library can include test scenarios, test programs, or test configurations (hereinafter referred to as "test scenarios") that are to be used to generate test signals that are to be used to validate the service 134 being validated. The test scenarios are stored in the test library and provided to the generator function, the receiving function, the analysis function, and the management function in the form of downloadable software modules. These test scenarios (test configuration modules) can enable the end-to-end validation function 142 to perform system-specific validation tests. Test scenarios may be created and/or customized by the user, in some embodiments.

The test scenarios (test configuration modules) may be combined to enable complex use cases to test the service 134 being validated in a complex manner. For example, the validation of an EPC may involve one set of modules whereas the validation of an IMS may involve another set of modules. These modules may be combined or used simultaneously to enable the validation of the evolved packet core ("EPC") and Internet Protocol ("IP") multimedia subsystem ("IMS") together as a system. It should be understood that this example is illustrative and therefore should not be construed as being limiting in any way.

The end-to-end validation function 142 can be remotely controllable either by an end user or by an automated system through the use of APIs to a management function of the end-to-end validation function 142. The main purpose of the management function is to coordinate the test scenarios between the generator function and the receiver function and to perform input/output operations between the end-to-end validation function 142 and other systems such as the service 134 being validated, a user, other services or functions, combinations thereof, or the like. The management function also can control input and output of signals to a system that requests the testing of the service 134, in some embodiments.

FIG. 1 illustrates one control system 102, one network 104, one operations management controller 106, one service creation database 108, one inventory 110, one infrastructure control 112, one instance of infrastructure 114, one network control 118, one service control 122, one service 134, one ECOMP 136, one BSS 138, one OSS 140, and one end-to-end validation function 142. It should be understood, however, that various implementations of the operating environment 100 can include zero, one, or more than one control system 102; zero, one, or more than one network 104; zero, one, or more than one operations management controller 106; zero, one, or more than one service creation database 108; zero, one, or more than one inventory 110; zero, one, or more than one infrastructure control 112; zero, one, or more than one instance of infrastructure 114; zero, one, or more than one network control 118; zero, one, or more than one service control 122; zero, one, or more than one service 134; zero, one, or more than one ECOMP 136; zero, one, or more than one BSS 138; zero, one, or more than one OSS 140; and/or zero, one, or more than one end-to-end validation functions 142. As such, the illustrated embodiment should be understood as being illustrative, and should not be construed as being limiting in any way.

Turning now to FIG. 2, additional aspects of the end-to-end validation function 142 are illustrated and described in detail. In particular, FIG. 2 shows the end-to-end validation function 142 and a service 134 operating on the infrastructure 114. According to some embodiments, as shown in FIG. 2, the end-to-end validation function 142 can be hosted and/or executed by a computer system 200. Although the service 134 is shown as being executed and/or hosted by the same infrastructure 114 that hosts or includes the computer system 200, this is not necessarily the case. In particular, the service 134 and/or the end-to-end validation functions 142 can be hosted and/or executed by different devices and/or infrastructure 114 in various embodiments. As such, the illustrated embodiment should be understood as being illustrative and therefore should not be construed as being limiting in any way.

The end-to-end validation function 142 can include multiple components, in some embodiments, as explained above and as shown in FIG. 2. In particular, the end-to-end validation function 142 can include a generator function 202, a receiver function 204, a test library 206, a management virtual function ("management function" or "management VF") 208, and an analysis function 210. According to some embodiments of the concepts and technologies described herein, the receiver function 204 and the analysis function 210 can be combined to form a receiving and analysis function, though this is not necessarily the case.

As shown in FIG. 2, the end-to-end validation function 142 can be configured by way of inputting configuration data 212 to the management function 208. Thus, the computer system 200 and/or the management function 208 can expose a configuration data API 214 via which the configuration data 212 can be input to the management function 208. Because the end-to-end validation function 142 can be configured in other ways (e.g., by issuing configuration commands, by modifying virtual machine images, etc.), it should be understood that this example of configuring the end-to-end validation function 142 via configuring the management function 208 is illustrative and therefore should not be construed as being limiting in any way.

The generator function 202 can be created and/or controlled by a service control function. As explained above, the service control function can be included in the service control 122 illustrated and described above with reference to FIG. 1 and/or established as the management function 208. The generator function 202 can be configured to generate test signals for input to the service 134. The test signals can be generated based upon one or more tests, test scenarios, test configurations, or other modules that can be included in the test library 206. It can be appreciated from the above description of the control system 102 that the generator function 202 can be instantiated by the operations management controller 106 or by other entities, according to various embodiments.

Copies of the test scenarios used by the generator function 202 also can be provided to the receiver function 204 and/or the analysis function 210 so that received output can be validated and/or compared against an expected output. The expected output can be generated by the receiver function 204 and/or the analysis function 210 and/or can be known. In some other embodiments, certain expected output can be stored with a test in the test library 206.

The receiver function 204 can receive output from the service 134. As such, the test signals that are input to the service 134 by the generator function 202 can result in output from the service 134, and this output from the service 134 can be captured by the receiver function 204. Thus, the end-to-end validation function 142 can encapsulate or encompass the service 134, thereby ensuring that input and output from the service 134 are unadulterated by other services or functions outside of the service 134 or VM being tested.

The analysis function 210 (and/or analysis functionality that can be embedded in the receiver function 204) can analyze the output to determine if the service 134 behaves as expected (e.g., the output matches the expected output), thereby validating the service 134. If the analysis function 210 or other functionality determines that the real output matches the expected output, the service 134 can be validated or a next operation in validation can be performed. If the analysis function 210 or other functionality determines that the real output does not match the expected output, the service 134 may not be validated or may be invalidated. It should be understood that this example is illustrative and therefore should not be construed as being limiting in any way.

As shown in FIG. 2, the end-to-end validation function 142 and/or the infrastructure 114 that hosts the end-to-end validation function 142 can be hosted or executed by the computer system 200. The computer system 200 can include a memory 216 and a processor 218. The computer system 200 can, via execution of computer-executable instructions stored in the memory 216 by the processor 218, provide the functionality illustrated and described herein with reference to the end-to-end validation function 142. Various methods or processes associated with the end-to-end validation function 142 are illustrated and described herein, particularly with reference to FIGS. 3-7. An example architecture of the computer system 200 is illustrated and described herein with reference to FIG. 7. It should be understood that these examples are illustrative and therefore should not be construed as being limiting in any way.

Figure 3:
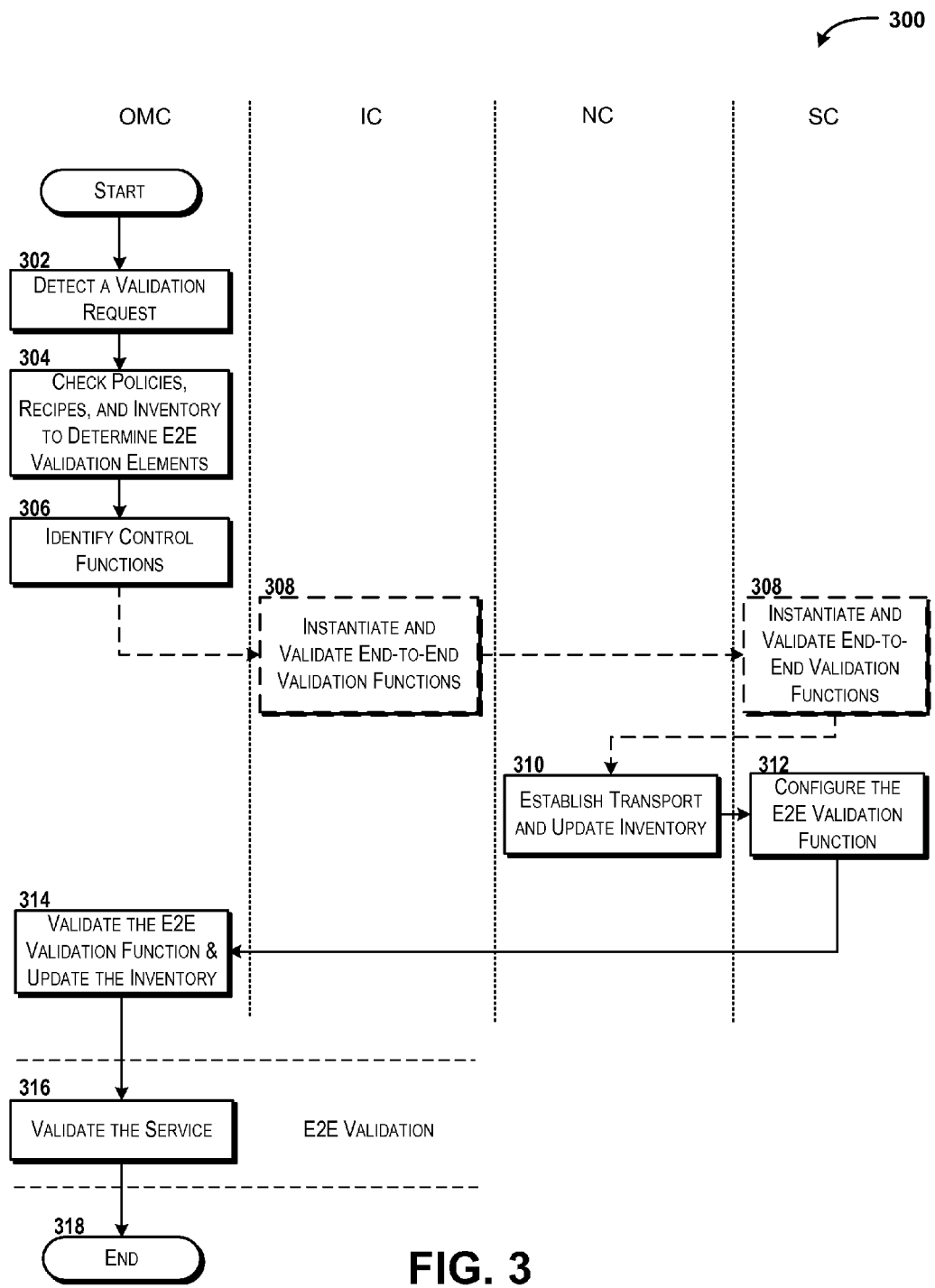
FIG. 3 is a flow diagram showing aspects of a method for instantiating an end-to-end validation function, according to an illustrative embodiment of the concepts and technologies described herein.

Turning now to FIG. 3, aspects of a method 300 for validating a service 134 using an end-to-end validation function 142 will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as the control system 102 or the computer system 200, to perform one or more operations and/or causing the processor to direct other components of the computing system or device to perform one or more of the operations.

For purposes of illustrating and describing the concepts of the present disclosure, the methods disclosed herein are described as being performed by the control system 102 or the computer system 200 via execution of one or more software modules such as, for example, the modules illustrated and described in FIGS. 1-2 including, but not limited to, the operations management controller 106, the infrastructure control 112, the network control 118, the service control 122, and/or the end-to-end validation function 142. It should be understood that additional and/or alternative devices and/or network nodes can provide the functionality described herein via execution of one or more modules, applications, and/or other software including, but not limited to, the modules shown in FIGS. 1-2. Furthermore, although the particular modules are mentioned as being capable of providing the disclosed operations, it should be understood that the illustrated embodiments are illustrative, and should not be viewed as being limiting in any way.

The method 300 begins at operation 302. At operation 302, the control system 102 can detect an end-to-end validation request. The end-to-end validation request can include a request relating to an end-to-end validation function 142. Thus, the end-to-end validation request can correspond to an order for end-to-end validation of a service 134, a request to instantiate a new service 134 and/or a new end-to-end validation function 142 that will provide end-to-end validation of the service 134, a request to scale an end-to-end validation function 142, a request to terminate an end-to-end validation function 142, or the like. It should be understood that the control system 102 can detect the end-to-end validation request in operation 302 or receive the end-to-end validation request.

In the embodiment shown in FIG. 3, the end-to-end validation request detected in operation 302 can correspond to a request to create a new end-to-end validation function 142 to effect validation of a service 134. In response to the end-to-end validation request (or detecting the end-to-end validation request), the control system 102 can begin operations as illustrated and described herein. In some embodiments, the control system 102 can perform operation 302 by executing the operations management controller 106 and/or functionality associated with the operations management controller 106 as illustrated in FIG. 3. It should be understood that this example is illustrative and therefore should not be construed as being limiting in any way.

From operation 302, the method 300 proceeds to operation 304. At operation 304, the control system 102 can check one or more policies, recipes, and/or inventory to determine end-to-end ("E2E") validation elements to include in an end-to-end validation function 142 that is responsive to the end-to-end validation request detected in operation 302. Thus, the control system 102 can determine or identify one or more components of the end-to-end validation function 142. Thus, the control system 102 can determine a generator function 202, a receiver function 204, a test library 206, a management function 208, an analysis function 210, and/or other components of the end-to-end validation function 142. At operation 304, the control system 102 also can check one or more policy rules to determine how an end-to-end validation function 142 should be created and/or various features, requirements, architecture, resources, and/or operational framework associated with the end-to-end validation function 142.

According to various embodiments of the concepts and technologies described herein, operation 304 can include determining that an end-to-end validation function 142 is to be created to provide validation of a service 134. In some embodiments, the control system 102 can perform operation 304 by executing the operations management controller 106 and/or functionality associated with the operations management controller 106 as illustrated in FIG. 3. It should be understood that this example is illustrative and therefore should not be construed as being limiting in any way.

From operation 304, the method 300 proceeds to operation 306. At operation 306, the control system 102 can identify an infrastructure control function, a network control function, and/or a service control function for the end-to-end validation function 142 that is requested by way of the end-to-end validation request received or detected in operation 302. According to various embodiments of the concepts and technologies described herein, the control system 102 can select an appropriate infrastructure control function, network control function, and/or service control function from any number of existing control functions to control the end-to-end validation function 142 and/or various components of the end-to-end validation function 142.

In some other embodiments, the control system 102 may determine that the appropriate service control function does not exist and, in response to making such a determination, can create the service control function that will control the end-to-end validation function 142. Thus, it should be understood that in addition to designating or selecting an infrastructure control function, network control function, and a service control function, operation 306 can include creating and/or allocating a service control function. In some embodiments, the control system 102 can perform operation 306 by executing the operations management controller 106 and/or functionality associated with the operations management controller 106 as illustrated in FIG. 3. It should be understood that this example is illustrative and therefore should not be construed as being limiting in any way.

From operation 306, the method 300 proceeds to operation 308. At operation 308, the control system 102 can instantiate and validate one or more virtual machines associated with the end-to-end validation function 142. According to some embodiments, the virtual machines instantiated in operation 308 can include one or more components of the end-to-end validation function 142 such as a generator function 202, a receiver function 204, a test library 206, a management function 208, and/or an analysis function 210 if requested or instructed by an entity such as the operations management controller 106. As explained above, the functionality of the analysis function 210 can be performed by other entities in some embodiments and need not be created within the end-to-end validation function 142 as illustrated and described herein with reference to FIG. 3.

According to various embodiments of the concepts and technologies described herein, the instantiation of the end-to-end validation function 142 can be completed by one or more of the infrastructure control 112, the network control 118, and/or the service control ("SC") 122. Thus, while FIG. 3 shows the instantiation of the end-to-end validation function 142 at the infrastructure control 112, it should be understood that this embodiment is one example embodiment and should not be construed as being limiting in any way. In particular, in some embodiments the infrastructure control 112 can instantiate one or more virtual machines and load images to the virtual machines where the images can include components of the end-to-end validation function 142.

In some embodiments, a recipe for an end-to-end validation function 142 can specify where and how the components of the end-to-end validation function 142 will be instantiated. Thus, in some embodiments the recipe can specify that the infrastructure control 112 will load the components of the end-to-end validation function 142 to one or more virtual machines, while in some other embodiments the recipe can specify, for example, that one or more virtual machine images including the functionality of the end-to-end validation function 142 will be deployed to the infrastructure 114. In some other embodiments, the recipe can specify one or more components of the end-to-end validation function 142 will be deployed to virtual machines after allocation of resources by the infrastructure control 112 to support the virtual machines. In yet other embodiments, the service control 122 can load the generator function 202, the receiver function 204, the test library 206, the management function 208, and/or the analysis function 210 to the virtual machines or other resources allocated by the infrastructure control 112. Thus, it should be understood that the various components of the control system 102 can instantiate and/or validate the components of the end-to-end validation function 142.

According to various embodiments, an event can be reported to an infrastructure DCAE process and/or the infrastructure inventory can be updated as part of operation 308 to indicate creation of the end-to-end validation function 142. Although not shown in FIG. 3, it should be understood that the operations management controller 106 module of the control system 102 can instruct the infrastructure control 112, or a component thereof, to instantiate one or more virtual machines. Thus, in some embodiments of the concepts and technologies described herein, where the components of the control system 102 can be distributed across multiple devices, it should be understood that communications between the components can occur to trigger one or more of the operations illustrated and described herein. It should be understood that this example is illustrative and therefore should not be construed as being limiting in any way.

In some embodiments of the method 300, the virtual machines and/or multiple virtual functions can be instantiated by the infrastructure control 112 module of the control system 102, while one or more end-to-end validation functions 142 and/or components thereof (e.g., a generator function 202 and/or a receiver function 204) can be instantiated and/or configured by the service control 122 as mentioned above. As such, in some embodiments, the control system 102 can perform operation 308 by executing the operations management controller 106, the infrastructure control 112, the service control 122 and/or functionality associated with the operations management controller 106, the infrastructure control 112, and/or the service control 122 as illustrated in FIG. 3. It should be understood that this example is illustrative and therefore should not be construed as being limiting in any way.

From operation 308, the method 300 proceeds to operation 310. At operation 310, the control system 102 can establish transport between the virtual machines, the end-to-end validation function 142, and/or components thereof instantiated and/or configured in operation 308. In operation 310, the control system 102 also can update the inventory 110 and/or one or more local inventories. Thus, operation 310 can include instructing the network control 118 to establish transport between the generator function 202, the receiver function 204, the test library 206, the management function 208, and/or the analysis function 210. Additionally, operation 310 can include the network control 118 creating transport or ensuring that transport exists between the components of the end-to-end validation function 142 and/or the service 134 that will be validated by the end-to-end validation function 142. In some embodiments, the control system 102 can perform operation 310 by executing the network control 118 and/or functionality associated with the network control 118 as illustrated in FIG. 3. It should be understood that this example is illustrative and therefore should not be construed as being limiting in any way.

In some embodiments of the method 300, the method 300 can proceed from operation 310 to operation 312. In particular, in some embodiments of the method 300 in which the one or more end-to-end validation functions 142 were not configured at operation 308, the method 300 can proceed from operation 310 to operation 312. In some other embodiments of the method 300 in which the end-to-end validation function 142 and/or components thereof such as the generator function 202 and/or the receiver function 204 have been configured, the method 300 can flow from operation 310 to operation 314.

At operation 312, the control system 102 can configure the end-to-end validation function 142 and/or one or more components thereof, which may be instantiated in operation 308. As used herein with reference to operation 312, "configuring" the end-to-end validation function 142 and/or components thereof can refer to activating the end-to-end validation function 142 and/or establishing a base or default configuration for the end-to-end validation function 142. Thus, operation 312 can include specifying what application programming interfaces the end-to-end validation function 142 will use, expose, or access, or the like.

It can be appreciated that if the end-to-end validation functions 142 (and/or the components thereof such as the generator function 202, the receiver function 204, the test library 206, the management function 208, and/or the analysis function 210) are instantiated and configured in operation 308, that operation 312 may be skipped or omitted. Thus, it can be appreciated that operation 312 may be performed by the control system 102, in some embodiments, where the infrastructure control 112 instantiates the end-to-end validation functions 142 (and/or the components thereof) in operation 308, though this is not necessarily the case. In some embodiments, the control system 102 can perform operation 312 by executing the service control 122 and/or functionality associated with the service control 122 as illustrated in FIG. 3. It should be understood that this example is illustrative and therefore should not be construed as being limiting in any way.

From operations 310 or 312, the method 300 proceeds to operation 314. At operation 314, the control system 102 can validate the end-to-end validation function 142. Thus, in operation 314, the control system 102 can determine that the end-to-end validation function 142 was created correctly and is functioning correctly. Once the end-to-end validation function 142 has been validated (as being correctly created and/or functioning correctly), the control system 102 can update the inventory 110 to reflect the new end-to-end validation function 142. In some embodiments, the control system 102 can perform operation 314 by executing the operations management controller 106 and/or functionality associated with the operations management controller 106 as illustrated in FIG. 3. It should be understood that this example is illustrative and therefore should not be construed as being limiting in any way.

From operation 314, the method 300 proceeds to operation 316. At operation 316, the control system 102 can validate the service 134 end-to-end. As explained above with reference to FIG. 2, the end-to-end validation function 142 can generate test signals based upon test scenarios in the test library 206 using the generator function 202 and route the test signals into a service 134 input. A receiver function 204 can receive output from the service 134. An analysis function 210 or other functionality can analyze the output and/or compare the output to expected output. A validation decision can be based upon a result of the analysis. The management function 208 can report the validation decision to other entities, if desired. The control system 102 can perform operation 316 by executing an end-to-end validation function 142 and/or functionality associated with an end-to-end validation function 142. It should be understood that this example is illustrative and therefore should not be construed as being limiting in any way.

From operation 316, the method 300 proceeds to operation 318. The method 300 ends at operation 318.

Figure 4:
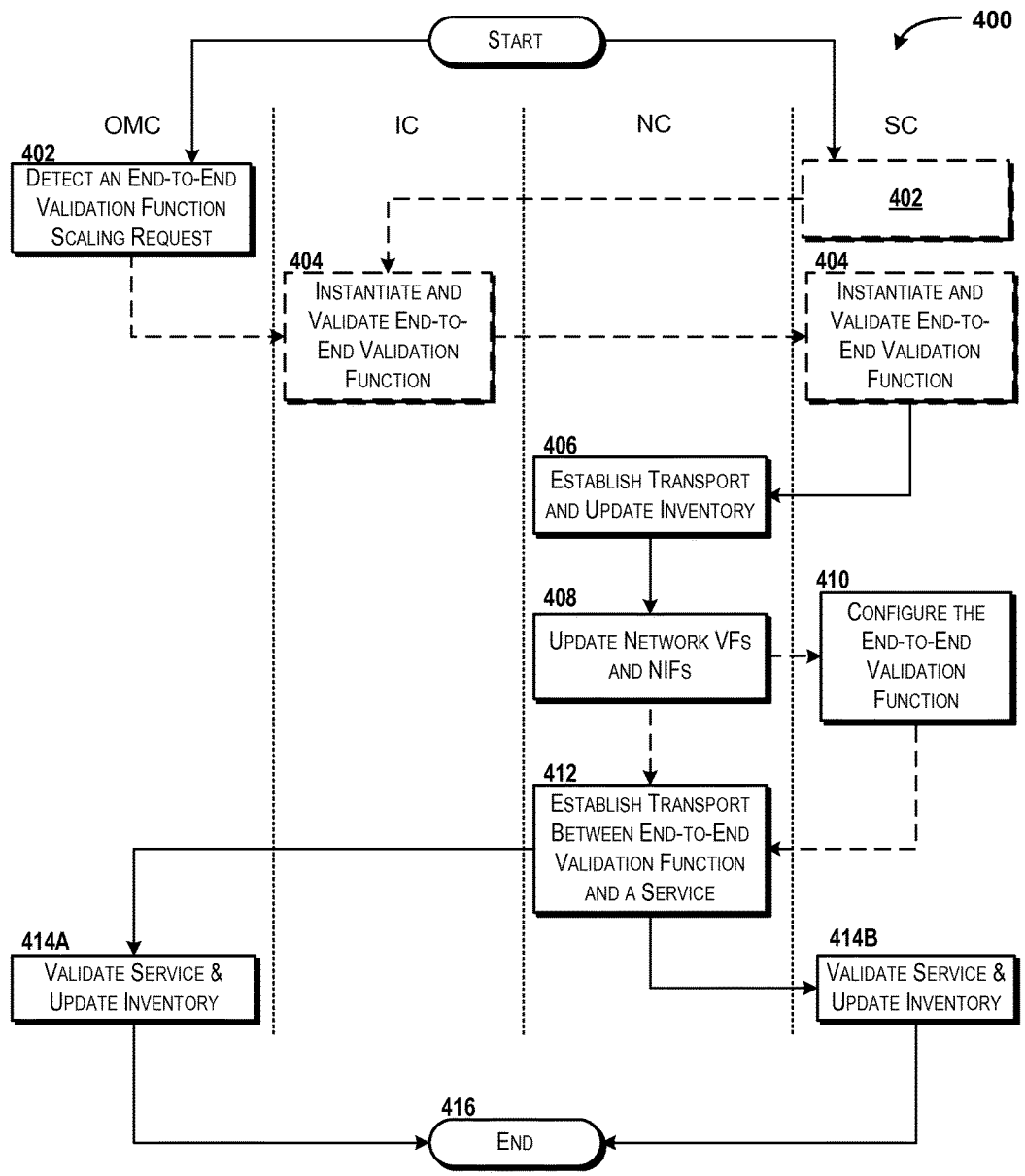
FIG. 4 is a flow diagram showing aspects of a method for scaling an end-to-end validation function, according to an illustrative embodiment of the concepts and technologies described herein.

Turning now to FIG. 4, aspects of a method 400 for scaling an end-to-end validation function 142 will be described in detail, according to an illustrative embodiment. The method 400 begins at operation 402. At operation 402, the control system 102 can detect (or receive) an end-to-end validation request. According to various embodiments of the concepts and technologies described herein, the end-to-end validation request detected or received in operation 402 can correspond to a request to adjust or change a capacity associated with the end-to-end validation function 142, or another type of end-to-end validation request. In some embodiments, the control system 102 can perform operation 402 by executing the operations management controller 106 and/or functionality associated with the operations management controller 106 as illustrated in FIG. 4. It should be understood that the request also can be created or initiated by the service control 122, as shown in FIG. 4. Because the request may be created by additional and/or alternative entities, the illustrated examples should be understood as being illustrative and therefore should not be construed as being limiting in any way.

From operation 402, the method 400 proceeds to operation 404. At operation 404, the control system 102 can instantiate and validate one or more virtual machines associated with the end-to-end validation function 142. As explained above with reference to FIG. 4, the images loaded and/or validated in operation 404 can include a standalone end-to-end validation function 142 and/or one or more components thereof such as a generator function 202, a receiver function 204, a test library 206, a management function 208, an analysis function 210, and/or the like. Thus, as explained above, the control system 102 can analyze the recipes, policies, or the like, to determine what virtual machines and/or functions are to be created, updated, or the like, as well as to determine what end-to-end validation functions 142 and/or components are to be created, updated, or the like.

According to various embodiments of the concepts and technologies described herein, the instantiation of the end-to-end validation function 142 can be completed by one or more of the infrastructure control 112, the network control 118, and/or the service control 122. Thus, while FIG. 4 shows the instantiation of the end-to-end validation function 142 at the infrastructure control 112, it should be understood that this embodiment is one example and should not be construed as being limiting in any way. In particular, in some embodiments the infrastructure control 112 can instantiate one or more virtual machines and load images to the virtual machines where the images can include components of the end-to-end validation function 142. Alternatively, the service control 122 can instantiate one or more components of the end-to-end validation function 142 and the network control 118 can create transport between and/or among the one or more components of the end-to-end validation function 142 and/or a service 134 validated by the end-to-end validation function 142.

In some embodiments, a recipe for an end-to-end validation function 142 can specify where and how the components of the end-to-end validation function 142 will be instantiated. Thus, in some embodiments the recipe can specify that the infrastructure control 112 will load the components of the end-to-end validation function 142 to the virtual machines as shown in FIG. 4. In some other embodiments, the recipe can specify that the service control 122 can load one or more components of the end-to-end validation function 142 to the virtual machines or other resources allocated by the infrastructure control 112. Thus, it should be understood that the various components of the control system 102 can instantiate and/or validate the components of the end-to-end validation function 142.

Although not shown in FIG. 4, it should be understood that the operations management controller 106 module of the control system 102 can instruct the infrastructure control 112, or a component thereof, to instantiate one or more virtual machines. Thus, in some embodiments where the components of the control system 102 are distributed across multiple devices, it should be understood that communications between the components can occur to trigger one or more of the operations illustrated and described herein. It should be understood that this example is illustrative and therefore should not be construed as being limiting in any way.

In some embodiments, the control system 102 can perform operation 404 by executing one or more of the operations management controller 106, the infrastructure control 112, the network control 118, the service control 122, and/or functionality associated with one or more of the operations management controller 106, the infrastructure control 112, the network control 118, and/or the service control 122. It should be understood that this example is illustrative and therefore should not be construed as being limiting in any way.

From operation 404, the method 400 proceeds to operation 406. At operation 406, the control system 102 can establish transport between the virtual machines and/or functions instantiated in operation 404 and update the inventory 110. Thus, in various embodiments of the concepts and technologies described herein, operation 406 can include establishing transport between the components of the end-to-end validation function 142 including, but not limited to, the generator function 202, the receiver function 204, the test library 206, the management function 208, the analysis function 210, and/or one or more virtual machines. In some embodiments, the control system 102 can update the inventory 110 and/or the local inventories associated with the various components or modules of the control system 102 to reflect creation and/or establishment of the transport in operation 406. Additionally, operation 406 can include the network control 118 creating transport or ensuring that transport exists between the various components of the end-to-end validation function 142. In some embodiments, the control system 102 can perform operation 406 by executing the network control 118, the service control 122, and/or functionality associated with the network control 118 or service control 122 as illustrated in FIG. 4. It should be understood that this example is illustrative and therefore should not be construed as being limiting in any way.

From operation 406, the method 400 proceeds to operation 408. At operation 408, the control system 102 can update network virtual functions and/or network infrastructure networking functions. In some embodiments, the control system 102 can perform operation 408 by executing the network control 118 and/or functionality associated with the network control 118 as illustrated in FIG. 4. It should be understood that this example is illustrative and therefore should not be construed as being limiting in any way.

In some embodiments of the method 400, the method 400 can proceed from operation 408 to operation 410. In particular, in some embodiments of the method 400 in which the end-to-end validation function 142 and/or components thereof such as the generator function 202 and the receiver function 204 were not configured at operation 408, the method 400 can proceed from operation 408 to operation 410. In some other embodiments of the method 400 in which the end-to-end validation function 142 and/or components thereof such as the generator function 202 and the receiver function 204 have been configured, the method 400 can flow from operation 408 to operation 412.

At operation 410, the control system 102 can configure the end-to-end validation function 142 and/or components thereof such as the generator function 202 and the receiver function 204. Configuring the end-to-end validation function 142 and/or components thereof in operation 410 can include activating the end-to-end validation function 142 and/or establishing a base or default configuration for the end-to-end validation function 142. Thus, operation 410 can include specifying what application programming interfaces the end-to-end validation function 142 will use, expose, or access, or the like. In some embodiments, the control system 102 can perform operation 410 by executing the service control 122 and/or functionality associated with the service control 122 as illustrated in FIG. 4. It should be understood that this example is illustrative and therefore should not be construed as being limiting in any way.

From operations 408 or 410, the method 400 proceeds to operation 412. At operation 412, the control system 102 can establish transport between the end-to-end validation function 142 and a service 134 that is being validated by the end-to-end validation function 142. It should be appreciated that in some embodiments of the method 400 in which operation 410 is omitted, operations 408 and 412 can be combined into a single operation. It should be understood that this example is illustrative and therefore should not be construed as being limiting in any way.

In some embodiments, the control system 102 can perform operation 412 by executing the network control 118 and/or functionality associated with the network control 118 as illustrated in FIG. 4. It should be understood that this example is illustrative and therefore should not be construed as being limiting in any way.

From operation 412, the method 400 proceeds to either operation 414A or 414B. At operations 414A and 414B, the control system 102 can validate the service 134 end-to-end and update the inventory 110. In some embodiments, the control system 102 can perform the updating of the inventory as shown in operations 414A and 414B by executing the operations management controller 106, the service control 122, and/or functionality associated with the operations management controller 106 or the service control 122 as illustrated in FIG. 4. In some embodiments, the control system 102 can perform the validation of the service 134 by executing the end-to-end validation function 142. Thus, while operations 414A and 414B are shown as being performed by the service control 122 and/or the operations management controller 106, it should be understood that the validation can occur at the end-to-end validation function 142 as shown in FIG. 3. As such, the illustrated embodiment should be understood as being illustrative and therefore should not be construed as being limiting in any way.

From operations 414A or 414B, the method 400 proceeds to operation 416. The method 400 ends at operation 416.

Figure 5:
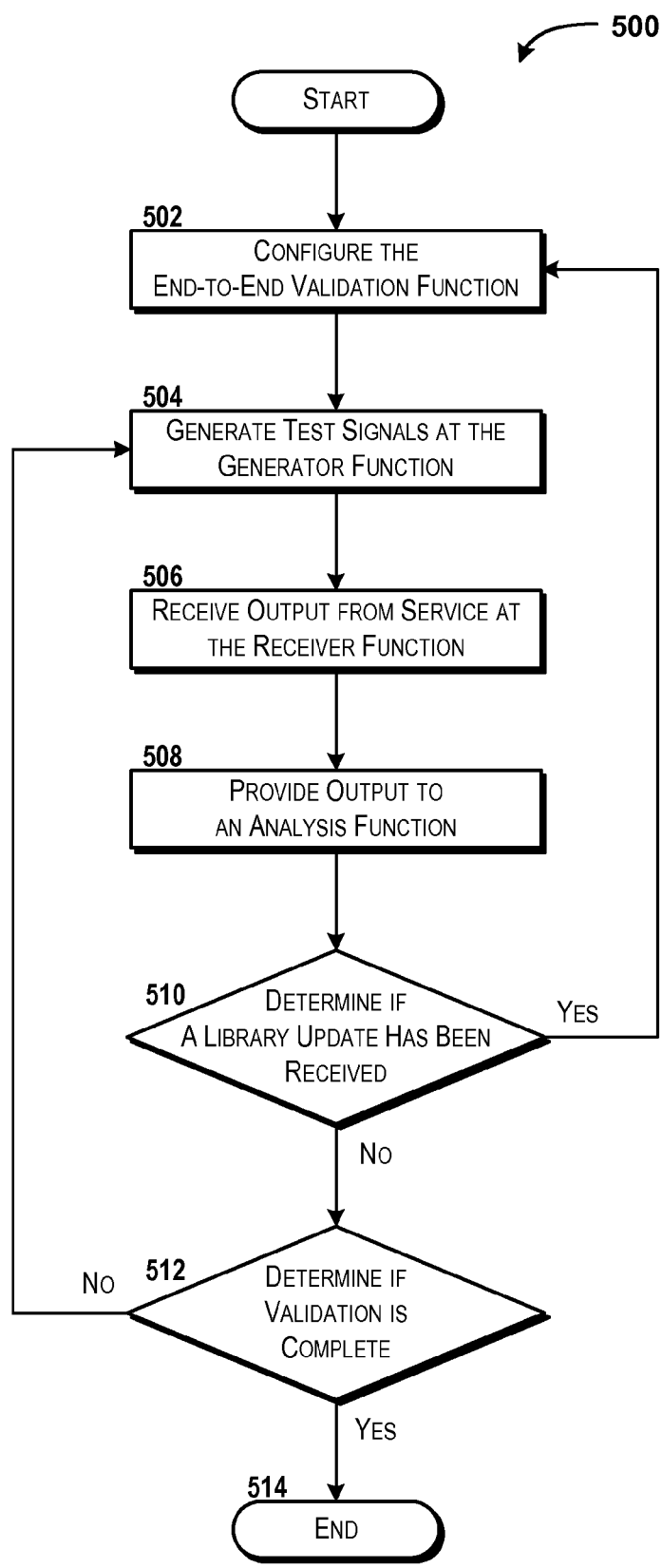
FIG. 5 is a flow diagram showing aspects of a method for configuring an end-to-end validation function, according to an illustrative embodiment of the concepts and technologies described herein.

Turning now to FIG. 5, aspects of a method 500 for configuring and executing an end-to-end validation function 142 will be described in detail, according to an illustrative embodiment. The method 500 begins at operation 502. At operation 502, the computer system 200 can configure the end-to-end validation function 142. As explained above, configuring the end-to-end validation function 142 can include configuring the generator function 202, configuring the receiver function 204, configuring the management function 208, and/or configuring the analysis function 210.

As noted above, configuration data 212 can be received at the management function 208 and/or other components of the end-to-end validation function 142 via the configuration data API 214 exposed by the management function 208. As such, configuring the end-to-end validation function 142 can include receiving the configuration data 212 via the configuration data API 214 and applying the configuration data 212 to the end-to-end validation function 142, though this is not necessarily the case. Configuring the end-to-end validation function 142 also can include defining the test library 206 and/or receiving one or more tests via an API (e.g., the configuration data API 214), wherein the received tests can be added to the test library 206 and/or the tests included in the test library 206 can be updated.

The end-to-end validation function 142 can be configured by data that instructs the generator function 202, the receiver function 204, and/or other components of the end-to-end validation function 142 regarding how the end-to-end validation is to be completed by the end-to-end validation function 142. Thus, the data can include instructions for generating test signals for input to a service 134 based upon one or more tests in the test library 206, instructions for receiving and/or interpreting output from a service 134, instructions for comparing the output to expected output, instructions for providing the output to an analysis function 210, combinations thereof, and the like.

From operation 502, the method 500 proceeds to operation 504. At operation 504, the computer system 200 can generate test signals at the generator function 202. The signals generated in operation 504 can be generated based upon one or more test scenarios saved within the test library 206. In some embodiments, as explained above, multiple test scenarios can be combined to generate a complex test scenario. Thus, in operation 504 the computer system 200 can analyze one or more test scenarios in the test library 206 and/or combine the one or more test scenarios to generate a test signal. Although not separately illustrated in FIG. 5, the operation 504 also can include transmitting the test signal generated in operation 504 to an input of the service 134 being tested. Thus, the test signal generated in operation 504 can be injected directly into the service 134 being tested, thereby isolating the input signal such that the input (test) signal is known. It should be understood that this example is illustrative and therefore should not be construed as being limiting in any way.

From operation 504, the method 500 proceeds to operation 506. At operation 506, the computer system 200 can receive output from the service 134 into which the test signal was input in operation 504. In particular, the output from the service 134 can be obtained at a receiver function 204 in operation 506. Thus, it can be appreciated that the test signal input into the service 134 by the end-to-end validation function 142 in operation 504 can lead to the output received by the end-to-end validation function 142 in operation 506. As such, it can be appreciated that the end-to-end validation function 142 can encompass the service 134 being tested, thereby isolating the inputs and outputs of the service 134 to ensure that the only data being considered at the output side of the service 134 is the test signal input on the input side of the service 134.

From operation 506, the method 500 proceeds to operation 508. At operation 508, the computer system 200 can provide the output signal received in operation 506 to an analysis entity such as the analysis function 210. Although not separately shown in FIG. 5, the analysis function 210 can compare the actual output received in operation 506 to an expected output, thereby validating the service 134 by recognizing the presence or absence of any differences in the actual output relative to the expected output.

From operation 508, the method 500 proceeds to operation 510. At operation 510, the computer system 200 and/or the control system 102 can determine if a library update has been received. In particular, the computer system 200 can determine if any update to the test library 206 has been detected. Because some embodiments support updating of the test library 206 by way of an API exposed by the computer system 200, the computer system 200 can be configured to detect updates to the test library 206. It should be understood that this example is illustrative and therefore should not be construed as being limiting in any way.

If the computer system 200 determines that an update to the test library 206 has been detected, execution of the method 500 can return to operation 502, and the computer system 200 can reconfigure the end-to-end validation function 142 in accordance with the detected changes. If the computer system 200 determines, in operation 510, that a library update has not been received, the method 500 can proceed to operation 512.

At operation 512, the computer system 200 can determine if the validation is complete. In some embodiments, the computer system 200 can determine that a test of a service 134 will include multiple test operations, or the like. Thus, operation 512 can include determining, by the computer system 200, if the test operations have been completed. If the computer system 200 determines, in operation 512, that the test operations are not complete, the method 500 can return to operation 504, wherein the test signals associated with another test operation can be generated. If the computer system 200 determines, at operation 512, that the validation is complete, the method 500 can proceed to operation 514. The method 500 can end at operation 514.

Figure 6:
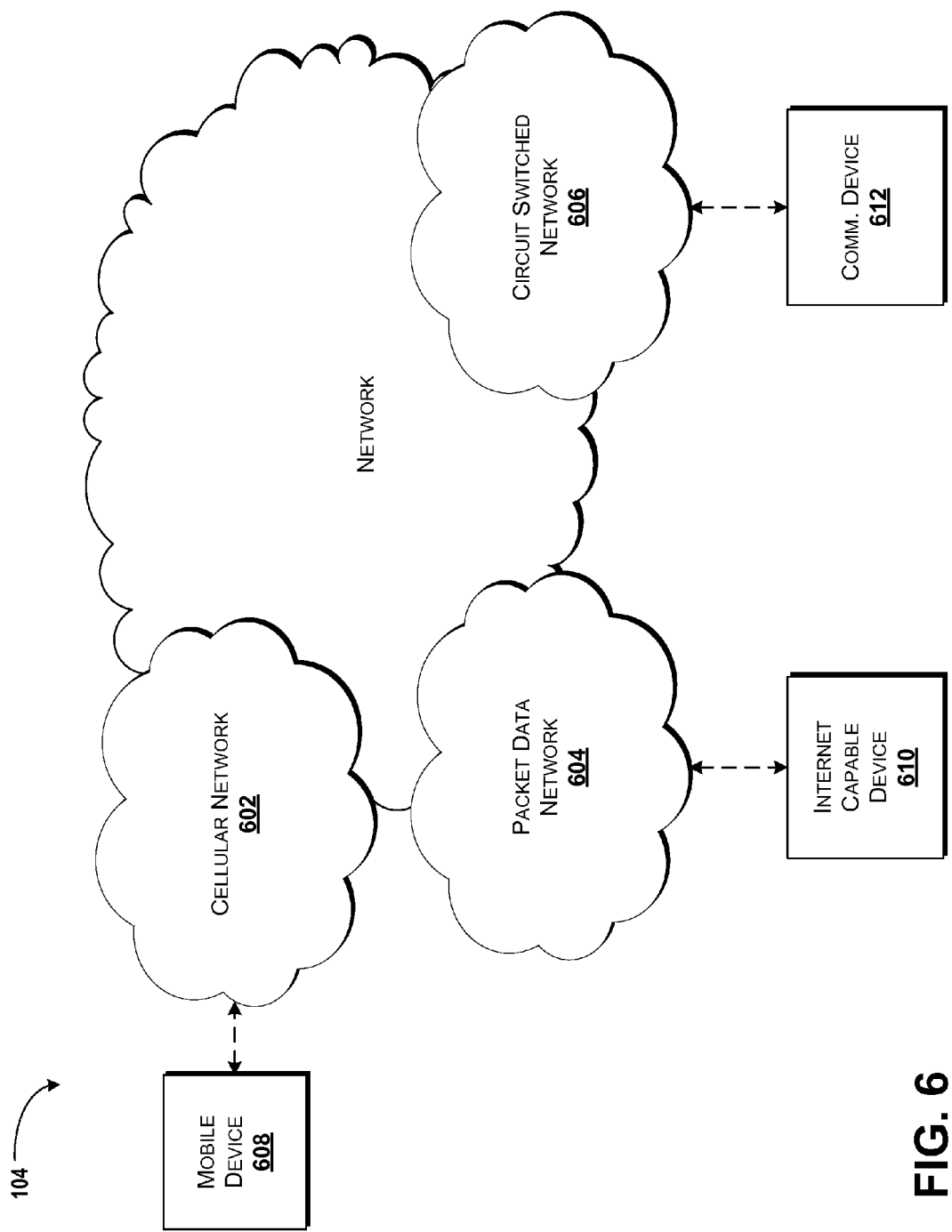
FIG. 6 schematically illustrates a network, according to an illustrative embodiment of the concepts and technologies described herein.

Turning now to FIG. 6, additional details of the network 104 are illustrated, according to an illustrative embodiment. The network 104 includes a cellular network 602, a packet data network 604, for example, the Internet, and a circuit switched network 606, for example, a publicly switched telephone network ("PSTN"). The cellular network 602 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 602 also includes radios and nodes for receiving and transmitting voice, data, and combinations thereof to and from radio transceivers, networks, the packet data network 604, and the circuit switched network 606.

A mobile communications device 608, such as, for example, a cellular telephone, a user equipment, a mobile terminal, a PDA, a laptop computer, a handheld computer, and combinations thereof, can be operatively connected to the cellular network 602. The cellular network 602 can be configured as a 2G GSM network and can provide data communications via GPRS and/or EDGE. Additionally, or alternatively, the cellular network 602 can be configured as a 3G UMTS network and can provide data communications via the HSPA protocol family, for example, HSDPA, EUL (also referred to as HSUPA), and HSPA+. The cellular network 602 also is compatible with 4G mobile communications standards as well as evolved and future mobile standards.

The packet data network 604 includes various devices, for example, servers, computers, databases, and other devices in communication with one another, as is generally known. The packet data network 604 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 604 includes or is in communication with the Internet. The circuit switched network 606 includes various hardware and software for providing circuit switched communications. The circuit switched network 606 may include, or may be, what is often referred to as a plain old telephone system (POTS). The functionality of a circuit switched network 606 or other circuit-switched network are generally known and will not be described herein in detail.

The illustrated cellular network 602 is shown in communication with the packet data network 604 and a circuit switched network 606, though it should be appreciated that this is not necessarily the case. One or more Internet-capable devices 610, for example, a PC, a laptop, a portable device, or another suitable device, can communicate with one or more cellular networks 602, and devices connected thereto, through the packet data network 604. It also should be appreciated that the Internet-capable device 610 can communicate with the packet data network 604 through the circuit switched network 606, the cellular network 602, and/or via other networks (not illustrated).

As illustrated, a communications device 612, for example, a telephone, facsimile machine, modem, computer, or the like, can be in communication with the circuit switched network 606, and therethrough to the packet data network 604 and/or the cellular network 602. It should be appreciated that the communications device 612 can be an Internet-capable device, and can be substantially similar to the Internet-capable device 610. In the specification, the network 104 is used to refer broadly to any combination of the networks 602, 604, 606. It should be appreciated that substantially all of the functionality described with reference to the network 104 can be performed by the cellular network 602, the packet data network 604, and/or the circuit switched network 606, alone or in combination with other networks, network elements, and the like.

Figure 7:
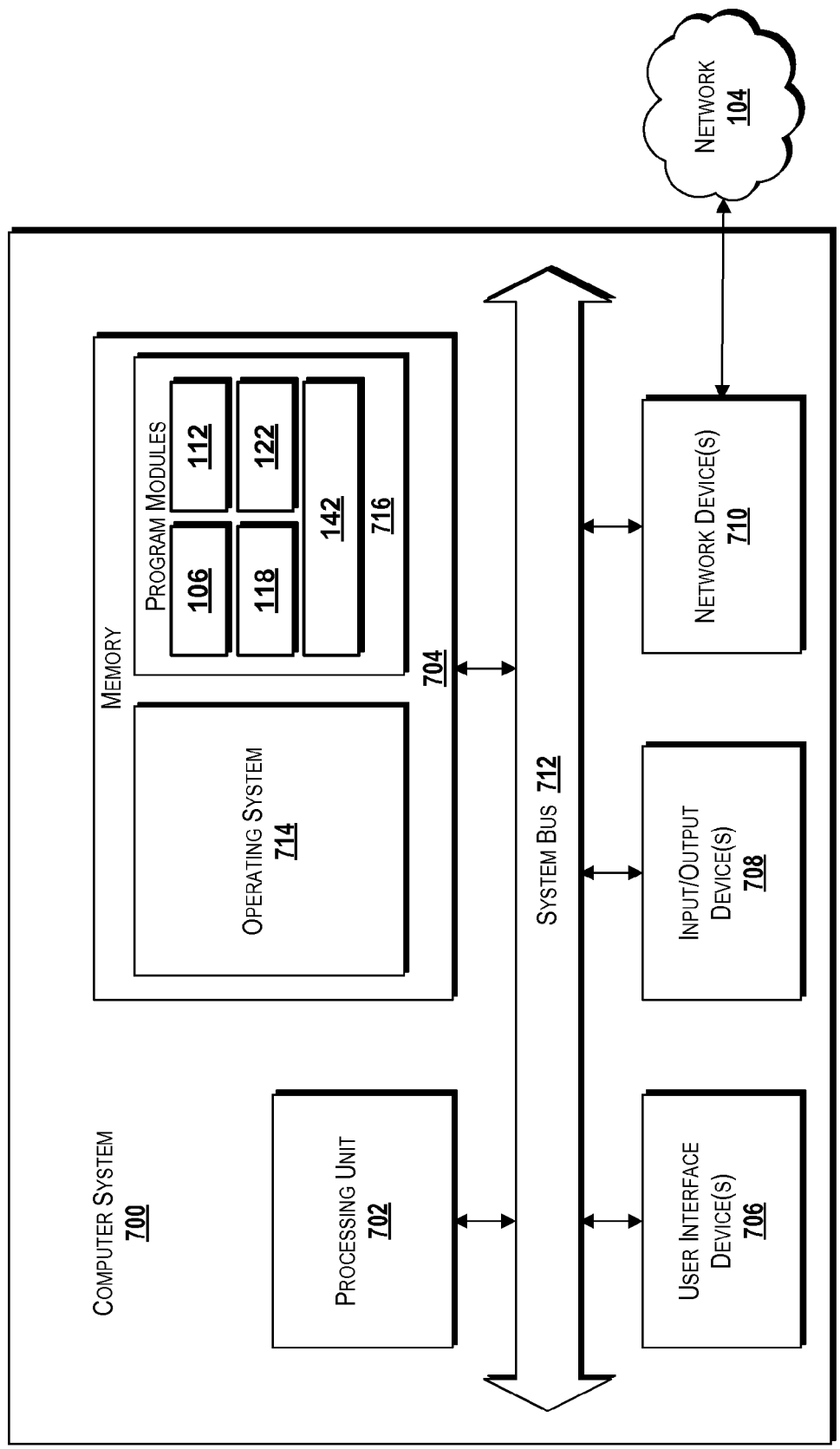
FIG. 7 is a block diagram illustrating an example computer system configured to provide end-to-end validation of virtual machines, according to some illustrative embodiments of the concepts and technologies described herein.

FIG. 7 is a block diagram illustrating a computer system 700 configured to provide the functionality described herein for creating and/or using a receiver function such as the end-to-end validation function 142, in accordance with various embodiments of the concepts and technologies disclosed herein. The computer system 700 includes a processing unit 702, a memory 704, one or more user interface devices 706, one or more input/output ("I/O") devices 708, and one or more network devices 710, each of which is operatively connected to a system bus 712. The bus 712 enables bi-directional communication between the processing unit 702, the memory 704, the user interface devices 706, the I/O devices 708, and the network devices 710.

The processing unit 702 may be a standard central processor that performs arithmetic and logical operations, a more specific purpose programmable logic controller ("PLC"), a programmable gate array, or other type of processor known to those skilled in the art and suitable for controlling the operation of the server computer. As used herein, the word "processor" and/or the phrase "processing unit" when used with regard to any architecture or system can include multiple processors or processing units distributed across and/or operating in parallel in a single machine or in multiple machines. Furthermore, processors and/or processing units can be used to support virtual processing environments. Processors and processing units also can include state machines, application-specific integrated circuits ("ASICs"), combinations thereof, or the like. Because processors and/or processing units are generally known, the processors and processing units disclosed herein will not be described in further detail herein.

The memory 704 communicates with the processing unit 702 via the system bus 712. In some embodiments, the memory 704 is operatively connected to a memory controller (not shown) that enables communication with the processing unit 702 via the system bus 712. The memory 704 includes an operating system 714 and one or more program modules 716. The operating system 714 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 716 may include various software and/or program modules described herein. In some embodiments, for example, the program modules 716 include the operations management controller 106, the infrastructure control 112, the network control 118, the service control 122, the end-to-end validation function 142, and/or other modules illustrated and described herein. These and/or other programs can be embodied in computer-readable media containing instructions that, when executed by the processing unit 702, perform one or more of the methods 300, 400, 500 described in detail above with respect to FIGS. 3-5. According to embodiments, the program modules 716 may be embodied in hardware, software, firmware, or any combination thereof. Although not shown in FIG. 7, it should be understood that the memory 704 also can be configured to store the policies, the service creation database 108, the inventory 110, the test library 206, the configuration data 212, and/or other data, if desired.

By way of example, and not limitation, computer-readable media may include any available computer storage media or communication media that can be accessed by the computer system 700. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 700. In the claims, the phrase "computer storage medium" and variations thereof does not include waves or signals per se and/or communication media.

The user interface devices 706 may include one or more devices with which a user accesses the computer system 700. The user interface devices 706 may include, but are not limited to, computers, servers, personal digital assistants, cellular phones, or any suitable computing devices. The I/O devices 708 enable a user to interface with the program modules 716. In one embodiment, the I/O devices 708 are operatively connected to an I/O controller (not shown) that enables communication with the processing unit 702 via the system bus 712. The I/O devices 708 may include one or more input devices, such as, but not limited to, a keyboard, a mouse, or an electronic stylus. Further, the I/O devices 708 may include one or more output devices, such as, but not limited to, a display screen or a printer.

The network devices 710 enable the computer system 700 to communicate with other networks or remote systems via a network, such as the network 104. Examples of the network devices 710 include, but are not limited to, a modem, a radio frequency ("RF") or infrared ("IR") transceiver, a telephonic interface, a bridge, a router, or a network card. The network 104 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 104 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Based on the foregoing, it should be appreciated that systems and methods for providing end-to-end validation of virtual machines have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

We claim:

1. A method comprising:
   detecting, at a control system comprising a processor, a validation request comprising a request to create an end-to-end validation function to perform end-to-end validation of a service;
   analyzing, by the processor, a policy to determine components of the end-to-end validation function and a virtual machine that will host the end-to-end validation function, wherein the components comprise a generator function and a receiver function, and wherein the generator function and the receiver function encompass the service;
   triggering, by the processor, loading of an image to the virtual machine and instantiation of the virtual machine, wherein the image comprises the end-to-end validation function; and
   validating, by the processor, the service using the end-to-end validation function based upon a test scenario stored in a test library of the end-to-end validation function.

2. The method of claim 1, wherein validating the service comprises:
   generating a test signal at the generator function based upon the test scenario;
   providing, by the generator function, the test signal to an input of the service;
   receiving an output from the service at the receiver function; and
   comparing the output to an expected output to determine if the service should be validated.

3. The method of claim 2, wherein the test scenario is added to the test library via interactions with the end-to-end validation function via a configuration data application programming interface exposed by a management function of the end-to-end validation function, and wherein the test scenario comprises a software module that generates the test signal.

4. The method of claim 3, wherein the test signal is generated based upon a plurality of test scenarios that are combined to emulate a complex test case.

5. The method of claim 1, wherein the end-to-end validation function comprises:
   the generator function;
   the receiver function;
   the test library;
   an analysis function; and
   a management function.

6. The method of claim 5, wherein validating the service comprises:
   generating a test signal at the generator function based upon the test scenario, wherein the test scenario comprises a software module that generates the test signal;
   providing, by the generator function, the test signal to an input of the service;
   receiving an output from the service at the receiver function;
   comparing, using the analysis function, the output to an expected output to determine if the service should be validated; and
   issuing a validation decision based upon the comparing.

7. The method of claim 1, further comprising configuring the end-to-end validation function using configuration data received via an application programming interface exposed by a management function of the end-to-end validation function.

8. The method of claim 7, further comprising:
determining if a library update has been received, the library update comprising a change to the test scenario stored in the test library;
if a determination is made that the library update has been received, configuring the end-to-end validation function to reflect the library update; and
if a determination is made that the library update has not been received, determining if validation of the service is complete.

9. The method of claim 1, wherein the end-to-end validation function is not part of the service.

10. The method of claim 9, wherein the end-to-end validation function is created as part of a further service.

11. A computer storage medium having computer-executable instructions stored thereon that, when executed by a processor, cause the processor to perform operations comprising:
detecting a validation request comprising a request to create an end-to-end validation function to perform end-to-end validation of a service;
analyzing a policy to determine components of the end-to-end validation function and a virtual machine that will host the end-to-end validation function, wherein the components comprise a generator function and a receiver function, and wherein the generator function and the receiver function encompass the service;
triggering loading of an image to the virtual machine and instantiation of the virtual machine, wherein the image comprises the end-to-end validation function; and
validating the service using the end-to-end validation function based upon a test scenario stored in a test library of the end-to-end validation function.

12. The computer storage medium of claim 11, wherein the end-to-end validation function comprises:
the generator function;
the receiver function;
the test library;
an analysis function; and
a management function.

13. The computer storage medium of claim 12, wherein validating the service comprises:
generating a test signal at the generator function based upon the test scenario, wherein the test scenario comprises a software module that generates the test signal;
providing, by the generator function, the test signal to an input of the service;
receiving an output from the service at the receiver function;
comparing, using the analysis function, the output to an expected output to determine if the service should be validated; and
issuing a validation decision based upon the comparing.

14. The computer storage medium of claim 11, wherein the computer-executable instructions, when executed by the processor, cause the processor to perform operations further comprising:
configuring the end-to-end validation function using configuration data received via an application programming interface exposed by a management function of the end-to-end validation function.

15. The computer storage medium of claim 11, wherein the end-to-end validation function is not part of the service.

16. A system comprising:
a processor; and
a memory that stores computer-executable instructions that, when executed by the processor, cause the processor to perform operations comprising
detecting a validation request comprising a request to create an end-to-end validation function to perform end-to-end validation of a service,
analyzing a policy to determine components of the end-to-end validation function and a virtual machine that will host the end-to-end validation function, wherein the components comprise a generator function and a receiver function, and wherein the generator function and the receiver function encompass the service,
triggering loading of an image to the virtual machine and instantiation of the virtual machine, wherein the image comprises the end-to-end validation function, and
validating the service using the end-to-end validation function based upon a test scenario stored in a test library of the end-to-end validation function.

17. The system of claim 16, wherein the end-to-end validation function comprises:
the generator function;
the receiver function;
the test library;
an analysis function; and
a management function.

18. The system of claim 17, wherein validating the service comprises:
generating a test signal at the generator function based upon the test scenario, wherein the test scenario comprises a software module that generates the test signal;
providing, by the generator function, the test signal to an input of the service;
receiving an output from the service at the receiver function;
comparing, using the analysis function, the output to an expected output to determine if the service should be validated; and
issuing a validation decision based upon the comparing.

19. The system of claim 16, wherein the computer-executable instructions, when executed by the processor, cause the processor to perform operations further comprising:
configuring the end-to-end validation function using configuration data received via an application programming interface exposed by a management function of the end-to-end validation function.

20. The system of claim 16, wherein the end-to-end validation function is not part of the service.

* * * * *